(12) United States Patent
Furuya

(10) Patent No.: US 11,163,821 B2
(45) Date of Patent: Nov. 2, 2021

(54) IMAGE EXTRACTION APPARATUS, IMAGE EXTRACTION METHOD, AND RECORDING MEDIUM STORING AN IMAGE EXTRACTION PROGRAM

(71) Applicant: FUJIFILM Corporation, Tokyo (JP)

(72) Inventor: Hiroyuki Furuya, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 203 days.

(21) Appl. No.: 16/147,596

(22) Filed: Sep. 29, 2018

(65) Prior Publication Data

US 2019/0102650 A1   Apr. 4, 2019

(30) Foreign Application Priority Data

Oct. 2, 2017   (JP) .............................. JP2017-192326

(51) Int. Cl.
*G06F 16/54* (2019.01)
*G06F 16/53* (2019.01)
*G06F 16/55* (2019.01)

(52) U.S. Cl.
CPC .............. *G06F 16/54* (2019.01); *G06F 16/53* (2019.01); *G06F 16/55* (2019.01)

(58) Field of Classification Search
None
See application file for complete search history.

(56) References Cited

U.S. PATENT DOCUMENTS

| | | | |
|---|---|---|---|
| 8,044,945 B2 | 10/2011 | Takamori et al. | |
| 8,352,465 B1* | 1/2013 | Jing | G06F 16/54 707/723 |
| 2003/0184667 A1 | 10/2003 | Aoyama | |
| 2003/0210808 A1* | 11/2003 | Chen | G06K 9/00221 382/118 |
| 2005/0168779 A1 | 8/2005 | Tsue et al. | |
| 2007/0076960 A1* | 4/2007 | Takamori | G06F 16/5838 382/224 |
| 2007/0174790 A1* | 7/2007 | Jing | G06F 16/54 715/838 |

(Continued)

FOREIGN PATENT DOCUMENTS

| | | | |
|---|---|---|---|
| JP | 2002-187329 A | 7/2002 | |
| JP | 2003037798 A | 2/2003 | |

(Continued)

OTHER PUBLICATIONS

An Office Action; "Notice of Reasons for Refusal", mailed by the Japanese Patent Office dated Oct. 28, 2020, which corresponds to Japanese Patent Application No. 2017-192326 and is related to U.S. Appl. No. 16/147,596 ; with English language translation.

*Primary Examiner* — Justin P. Misleh
(74) *Attorney, Agent, or Firm* — Studebaker & Brackett PC

(57) ABSTRACT

Provided are an image extraction apparatus and an image extraction method of finding a similar image conforming to a user's intention. A similarity determination condition designation window in which a plurality of similarity determination conditions are displayed is displayed. A user selects a desired similarity determination condition from among the plurality of similarity determination conditions displayed in the displayed similarity determination condition designation window. The user can determine a similarity determination condition, and can thus find a similar image conforming to the user's intention.

23 Claims, 19 Drawing Sheets

(56) References Cited

U.S. PATENT DOCUMENTS

2008/0301586 A1\* 12/2008 Ayatsuka ............... G06F 16/54
                                                    715/840
2014/0079322 A1    3/2014  Yamaji et al.
2015/0077376 A1    3/2015  Masuda

FOREIGN PATENT DOCUMENTS

| JP | 2003281540 A  | 10/2003 |
|----|---------------|---------|
| JP | 2007097090 A  | 4/2007  |
| JP | 4346859 B2    | 10/2009 |
| JP | 4455302 B2    | 4/2010  |
| JP | 2011-257980 A | 12/2011 |
| JP | 2013-246555 A | 12/2013 |
| JP | 5655112 B2    | 1/2015  |
| JP | 2017-010247 A | 1/2017  |
| JP | 2017-054552 A | 3/2017  |

\* cited by examiner

FIG. 9

CHECK SIMILARITY DETERMINATION CONDITION TO BE ADDED

71 ☐ SET ONLY IMAGES HAVING IDENTICAL TINT AS SIMILAR IMAGES

72 ☐ — — — — — — —

73 ☐ — — — — — — —

74 ☐ — — — — — — —

75 ☐ — — — — — — —

76 CREATE SIMILARITY DETERMINATION CONDITION

77 BACK

CHECK CONFORMITY CONDITION AND DESIGNATE CONFORMITY

101 ☑ EYES CLOSING  NEVER —■105— SLIGHT

102 ☑ BLURRING  STRICT —■106— GENTLE

103 ☐ EXPOSURE  BRIGHT —■107— DARK

104 ☑ FACIAL EXPRESSION  LAUGH ☑ 108  SMILE ☐ 109  NATURAL ☐ 110  CRY ☐ 111

112 CREATE CONFORMITY CONDITION   113 DETERMINE

100

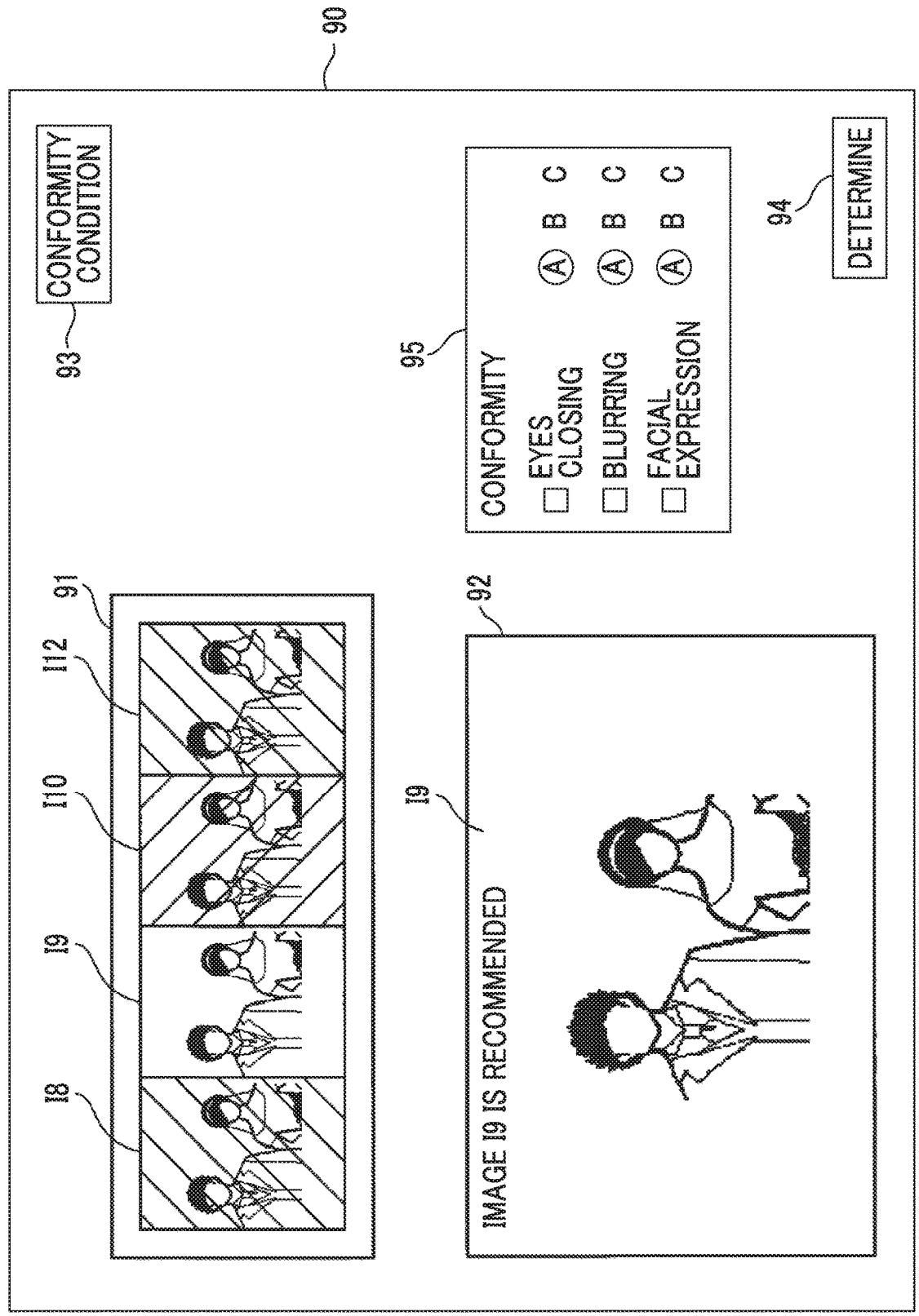

IMAGE EXTRACTION APPARATUS, IMAGE EXTRACTION METHOD, AND RECORDING MEDIUM STORING AN IMAGE EXTRACTION PROGRAM

CROSS-REFERENCE TO RELATED APPLICATIONS

The present application claims priority under 35 U.S.C. § 119 to Japanese Patent Application No. 2017-192326, filed Oct. 2, 2017. Each of the above application(s) is hereby expressly incorporated by reference, in its entirety, into the present application.

BACKGROUND OF THE INVENTION

1. Field of the Invention

The present invention relates to an image extraction apparatus, an image extraction method, an image extraction program, and a recording medium storing program.

2. Description of the Related Art

In an event such as a wedding, a large number of images are captured. Favorably captured images are selected from among the many images, and, for example, an album is created. Thus, there have been proposed a technique in which images appropriate to be used in an album are automatically selected (JP5655112B), and a technique in which a state of an image to be inserted into an image insertion region of an album is designated, and an image suitable for the designated state is inserted into the image insertion region (JP4455302B). There have been proposed a technique in which a user is notified of a failure image before printing is performed (JP2002-187329A), and a technique in which a region in a predetermined range of an image is enlarged and displayed, and thus a focus is checked (JP4346859B).

There have also been proposed a technique in which an image is selected while checking a layout of a photobook (JP2017-010247A), a technique in which a large number of images are reproduced and displayed with high efficiency (JP2013-246555A), a technique in which a picture is easily retrieved (JP2017-054552A), and a technique in which switching between a similar image screen and a screen including a dissimilar image can be easily performed (JP2011-257980A).

SUMMARY OF THE INVENTION

In the technique disclosed in JP5655112B, since an image having a favorable evaluation value is selected, in a case where an evaluation value for an image is favorable, a plurality of similar images may be selected. Also in the technique disclosed in JP4455302B, an image suitable for the designated state is inserted into the image insertion region, and thus a plurality of similar images may be inserted into an album. In the technique disclosed in JP2002-187329A, a user is notified of a failure image before printing is performed, and, in the technique disclosed in JP4346859B, a region in a predetermined range of an image is enlarged and displayed, and thus a focus is checked. Therefore, there is no disclosure of a plurality of similar images.

In the technique disclosed in JP2017-010247A, images are selected, a similarity condition is set on the basis of the selected images, and candidate images satisfying the similarity condition are displayed in a display region. In the technique disclosed in JP2017-010247A, since a similarity condition may not be set unless an image is selected, in a case where there are a plurality of images, each image is required to be checked. The technique disclosed in JP2013-246555A does not suggest that similar image information indicating whether or not two images continuously displayed in order are similar images is displayed, and it is determined whether or not a certain image is a similar image. In the technique disclosed in JP2017-054552A, for example, a keyword such as a "rose" is entered, and thus images related to the "rose" are displayed, but a condition for image similarity determination is not disclosed. In the technique disclosed in JP2011-257980A, similar images of an image of a dog viewed live on a screen are horizontally displayed in a line, and a condition for image similarity determination is not disclosed. Thus, a similar image intended by a user may not be found.

An object of the invention is to be able to find a similar image conforming to a user's intention.

According to the present invention, there is provided an image extraction apparatus comprising a similarity determination condition reception device (similarity determination condition reception means) for receiving entry of a similarity determination condition for determining whether or not any two images among a plurality of images are similar to each other in a case where the two images are contrasted with each other; a similar image group determination device (similar image group determination means) for determining one or a plurality of similar image groups including two or more images similar to each other according to the similarity determination condition received by the similarity determination condition reception device; and an image extraction device (image extraction means) for extracting at least one image from the one or plurality of similar image groups determined by the similar image group determination device.

According to the present invention, there may be provided An image extraction apparatus comprising a processor configured to receiving entry of a similarity determination condition for determining whether or not any two images among a plurality of images are similar to each other in a case where the two images are contrasted with each other; determining one or a plurality of similar image groups including two or more images similar to each other according to the received similarity determination condition; and extracting at least one image from the determined one or plurality of similar image groups.

According to the present invention, there is provided an image extraction method suitable for an image extraction apparatus. In other words, the image extraction method includes causing a similarity determination condition reception device to receive entry of a similarity determination condition for determining whether or not any two images among a plurality of images are similar to each other in a case where the two images are contrasted with each other; causing a similar image group determination device to determine one or a plurality of similar image groups including two or more images similar to each other according to the similarity determination condition received by the similarity determination condition reception device; and causing an image extraction device to extract at least one image from the one or plurality of similar image groups determined by the similar image group determination device.

The image extraction apparatus may further include a first image display control device (first image display control means) for displaying a plurality of images in a first display window formed on a display screen of a display device, and displaying images included in the one or plurality of similar image groups determined by the similar image group determination device and images not included in the similar image groups in a differentiated manner.

Among the plurality of similar image groups, the first image display control device preferably displays a certain similar image group and the other similar image groups in a differentiated manner.

The image extraction apparatus may further include a similar image group designation device (similar image group designation means) for designating a single similar image group from the one or plurality of similar image groups determined by the similar image group determination device; and a similar image display control device (similar image display control means) for displaying images which are included in the similar image group designated by the similar image group designation device and are similar to each other, to be adjacent to each other in a second display window which is different from the first display window. Images similar to each other being displayed to be adjacent to each other indicates that an image (captured image) and an image (captured image) similar to each other are consecutively displayed without an image dissimilar to the images being interposed therebetween, and a decoration such as a sentence or a mark may be interposed between the images similar to each other as long as a dissimilar image is not interposed between the images. Images may be arranged horizontally or vertically. The first display window and the second display window may be displayed not to overlap each other, a part of the second display window may be displayed to overlap a part of the first display window from the top, and the second display window may be displayed to overlap the first display window so as to be included in the first display window.

The image extraction apparatus may further include a similarity determination condition designation window display control device (similarity determination condition designation window display control means) for displaying a similarity determination condition designation window in which a plurality of similarity determination conditions are displayed, on a display screen of a display device. In this case, the similarity determination condition reception device receives entry of a similar image determination condition according to a similarity determination condition designated among the plurality of similarity determination conditions displayed in the similarity determination condition designation window.

The image extraction apparatus may further include a similar image group designation device (similar image group designation means) for designating a single similar image group from the one or plurality of similar image groups determined by the similar image group determination device; a conformity condition reception device (conformity condition reception means) for receiving entry of a conformity condition for an image; a conformity calculation device (conformity calculation means) for calculating a conformity in the conformity condition received by the conformity condition reception device with respect to an image designated among images which are included in the similar image group designated by the similar image group designation device and are similar to each other; and a conformity notification device (conformity notification means) for performing a notification of the conformity calculated by the conformity calculation device.

The image extraction apparatus may further include a conformity condition designation window display control device (conformity condition designation window display control means) for displaying a conformity condition designation window in which a plurality of conformity conditions are displayed, on a display screen of a display device. In this case, the conformity condition reception device receives entry of a conformity condition designated among the plurality of conformity conditions displayed in the conformity condition designation window.

Among a plurality of similar image groups, an image included in a certain similar image group is determined as being dissimilar to images included in the other similar image groups on the basis of the similarity determination condition received by the similarity determination condition reception device.

The image extraction apparatus may further include a similarity determination condition entry window display control means (similarity determination condition entry window display control means) for displaying a similarity determination condition entry window for entering a similarity determination condition on a display screen of a display device. In this case, the similarity determination condition reception device receives entry of a similarity determination condition which is entered in the similarity determination condition entry window.

The image extraction apparatus may further include a conformity condition entry window display control device (conformity condition entry window display control means) for displaying a conformity condition entry window for entering a conformity condition on a display screen of a display device. In this case, the conformity condition reception device receives entry of a conformity condition which is entered in the conformity condition entry window.

The image extraction apparatus may further include a similar image group designation device (similar image group designation means) for designating a single similar image group from the one or plurality of similar image groups determined by the similar image group determination device; a conformity calculation device (conformity calculation means) for calculating conformities in the conformity condition received by the conformity condition reception device with respect to images which are included in the similar image group designated by the similar image group designation device; and a recommended image notification device (recommended image notification means) performing a notification of an image with the highest conformity among the conformities calculated by the conformity calculation device, as a recommended image to be extracted by the image extraction device.

Entry of a similarity determination condition for determining whether or not any two images among a plurality of images are similar to each other in a case where the two images are contrasted with each other is received, and one or a plurality of similar image groups including two or more images similar to each other are determined according to the received similarity determination condition. At least one image is extracted from the determined similar image groups. A user can determine a similarity determination condition, and a similar image group can be determined according to the similarity determination condition determined by the user. The user can determine such a similarity determination condition that images determined as being dissimilar to each other in a case where similarity is determined through mere comparison between the images are determined as being similar to each other, and, conversely, that images determined as being similar to each other in a case where similarity is determined through mere comparison between the images are determined as being dissimilar to each other. It is possible to find similar images conforming to the user's intention. A similar image group is determined, and thus it is possible to comparatively easily recognize similar images even in a case where multiple images are present. At least one image can be extracted for each similar image group.

BRIEF DESCRIPTION OF THE DRAWINGS

FIG. 9 illustrates an example of a similarity determination condition adding window.

FIG. 13 illustrates an example of a conformity condition designation window.

FIG. 19 illustrates an example of an image checking window.

DESCRIPTION OF THE PREFERRED EMBODIMENTS

First Embodiment

Figure 1:
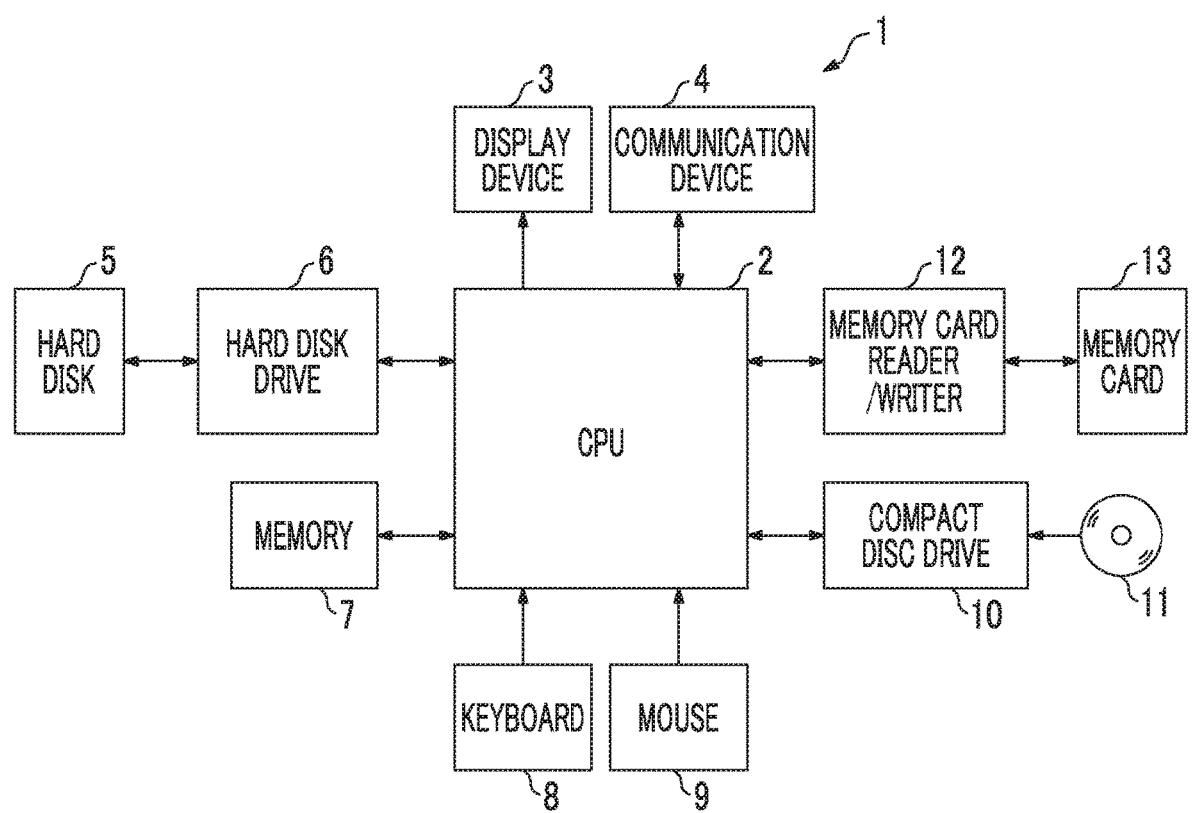
FIG. 1 is a block diagram illustrating an electrical configuration of an image extraction apparatus.

FIG. 1 illustrates an embodiment of the invention, and is a block diagram illustrating an electrical configuration of an image extraction apparatus 1.

The entire operation of the image extraction apparatus 1 is controlled by a central processing unit (CPU) 2.

The image extraction apparatus 1 includes a display device 3 which displays an image and other information on a display screen, and a communication device 4 which is connected to the Internet or other networks and performs communication with apparatuses other than the image extraction apparatus 1. The image extraction apparatus 1 also includes a hard disk 5, a hard disk drive 6 which accesses the hard disk 5, a memory 7 which stores data or the like, and a keyboard 8 and a mouse 9 for inputting a command or the like. The image extraction apparatus 1 also includes a compact disc drive 10 which accesses a compact disc 11, and a memory card reader/writer 12 which writes data to a memory card 13 and reads data recorded on the memory card 13.

An operation program of the image extraction apparatus 1 which will be described later is received in the communication device 4 via the Internet. The received operation program is installed in the image extraction apparatus 1. The operation program may be recorded on a portable recording medium such as the compact disc 11, and may be read from the portable recording medium, instead of being received by the image extraction apparatus 1 via a network such as the Internet and being installed in the image extraction apparatus 1. In this case, the operation program read from the portable recording medium is installed in the image extraction apparatus 1. Needless to say, a computer (CPU 2) of the image extraction apparatus 1 may read the operation program.

FIGS. 2 to 6 are flowcharts illustrating process procedures in the image extraction apparatus 1.

In this embodiment, similar images are found from multiple (a plurality of) images, and a user is notified of the similar images in the multiple images. Particularly, entry of a similarity determination condition for determining whether or not two images of a plurality of images are similar to each other through contrast is received, and similar images are found according to the received similarity determination condition. The similarity determination condition may be changed or created by the user, and thus similar images may be determined by the user's intention.

Figure 2:
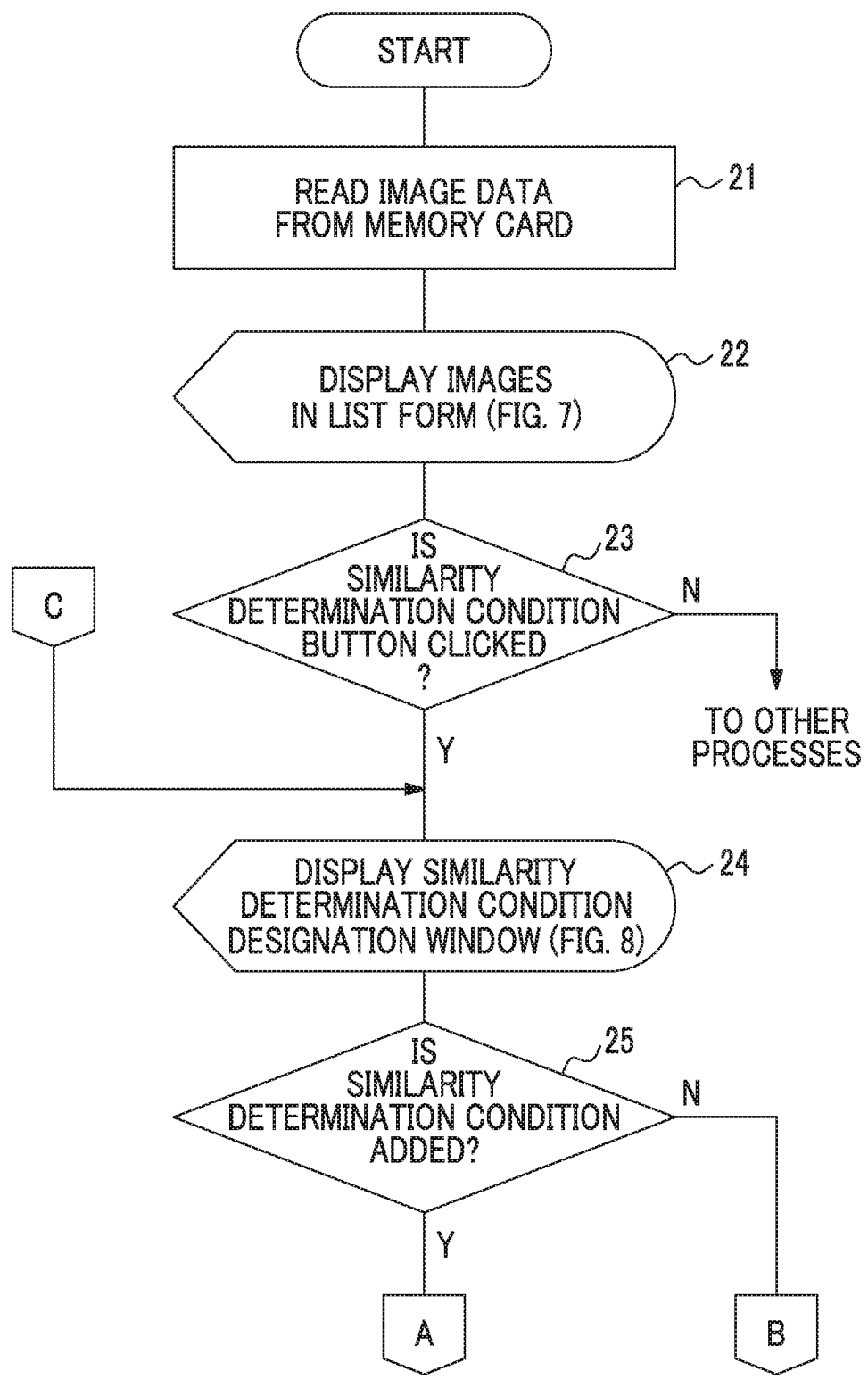
FIG. 2 is a flowchart illustrating a process procedure in the image extraction apparatus.
Figure 3:
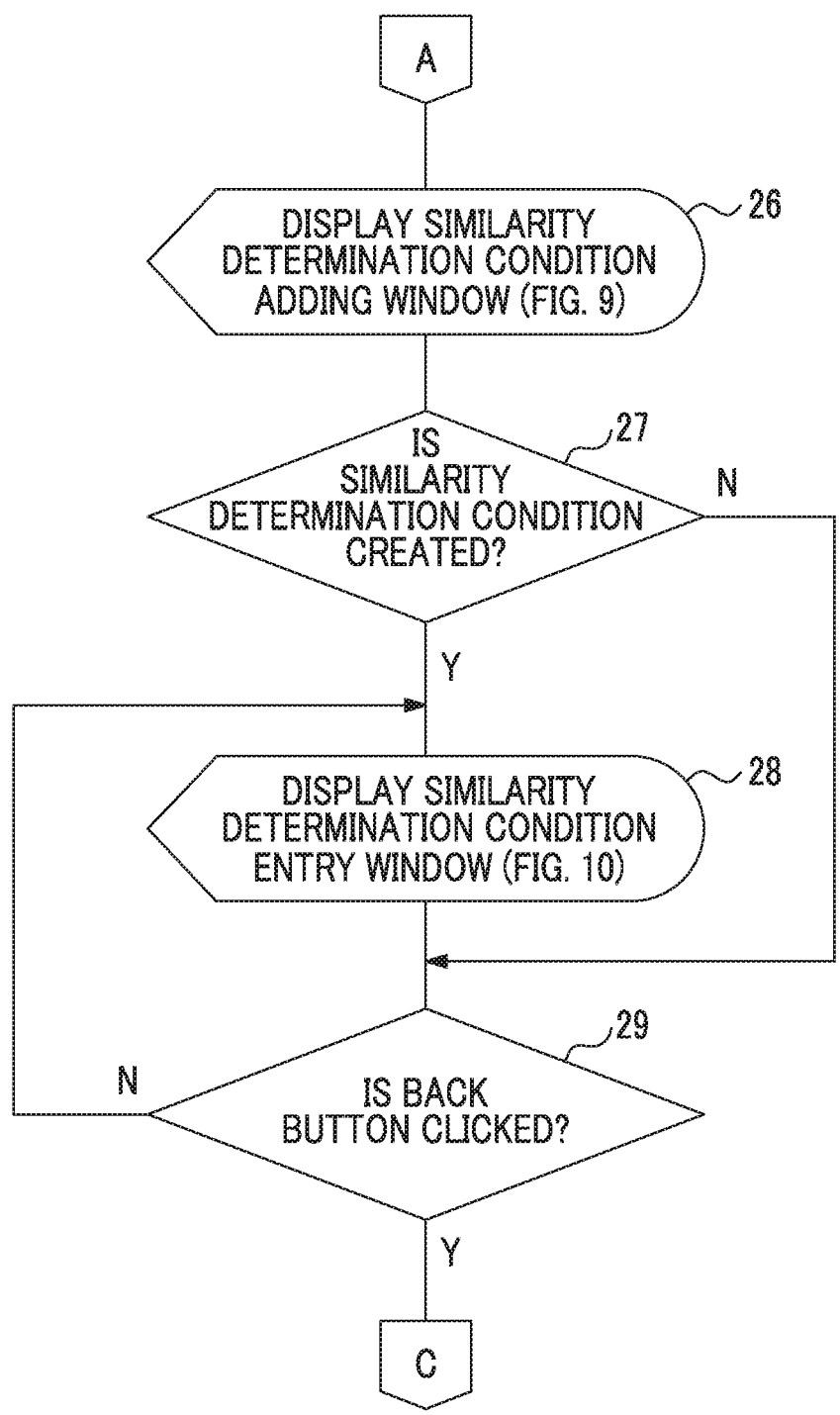
FIG. 3 is a flowchart illustrating a process procedure in the image extraction apparatus.

Image data indicating multiple (a plurality of) images is stored in the memory card 13, and the image data stored in the memory card 13 is read by the memory card reader/writer 12 (step 21 in FIG. 2). Multiple (a plurality of) images indicated by the read image data are displayed in a list form on a display screen of the display device 3 (step 22 in FIG. 2).

Figure 7:
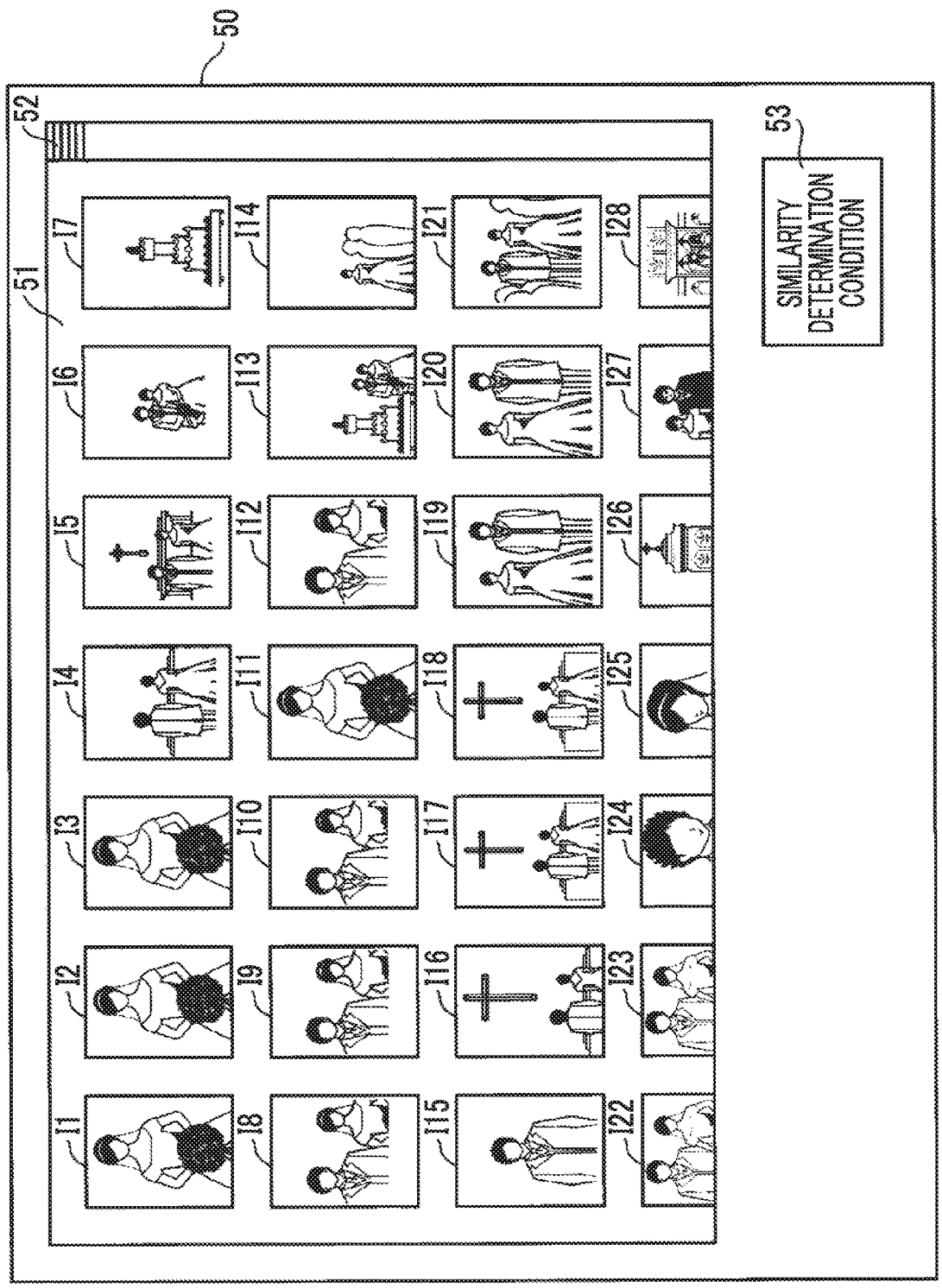
FIG. 7 illustrates an example of an image list window.

FIG. 7 illustrates an example of an image list window 50 displayed on the display screen of the display device 3.

An image list display region 51 is formed in the image list window 50. Multiple images indicated by image data read from the memory card 13 is displayed in the image list display region 51. A slider 52 which can be vertically slid according to an instruction (drag operation) from a user is formed on a right part of the image list display region 51. A similarity determination condition button 53 attached with the text "similarity determination condition" is formed to be clicked on a lower right part of the image list display region 51.

Images from an image I1 to an image I28 (each of the image I22 to the image I28 is a part of an image) are displayed in the image list display region 51. Images which are indicated by image data read from the memory card 13 and are not displayed in the image list display region 51 are displayed in the image list display region 51 by moving the slider 52 downward.

Figure 8:
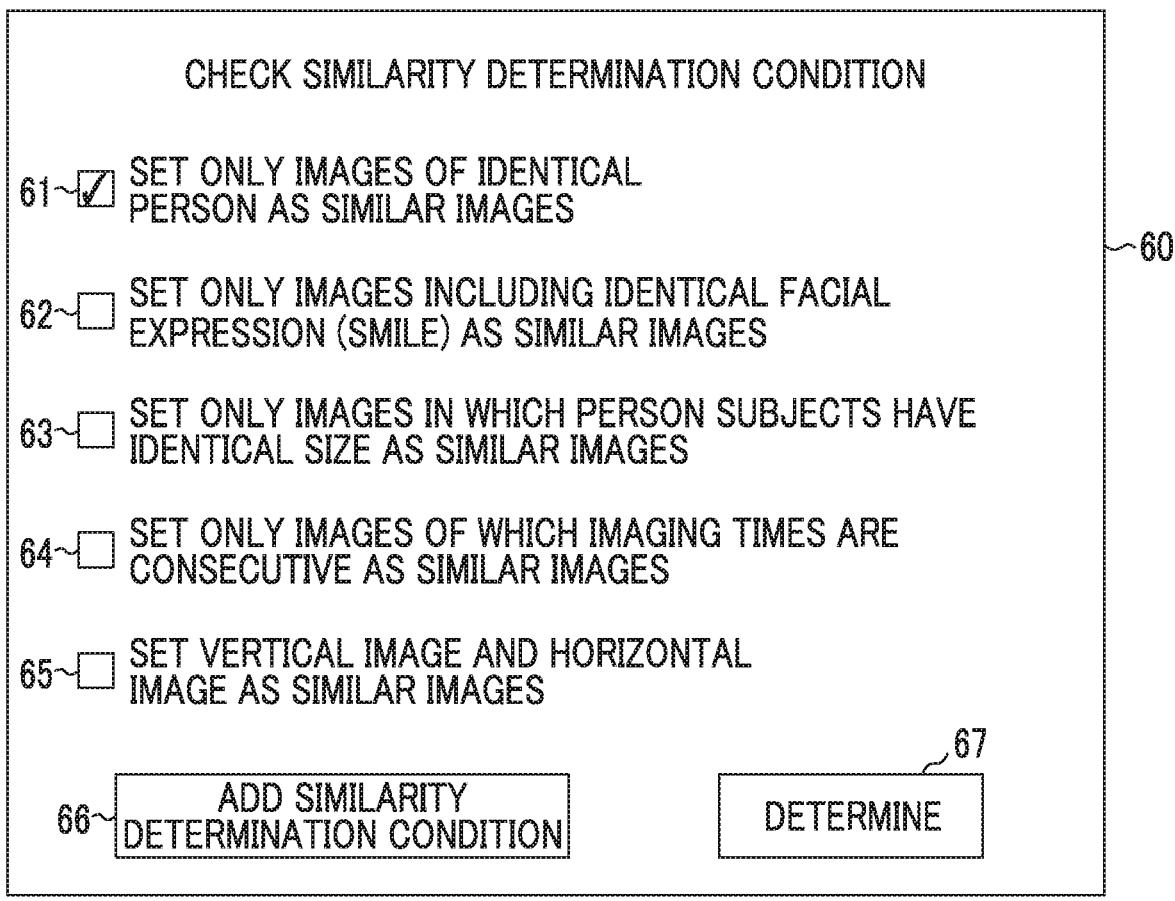
FIG. 8 illustrates an example of a similarity determination condition designation window.

In a case where the user clicks the similarity determination condition button 53 by using the mouse 9 (YES in step 23 in FIG. 2), a similarity determination condition designation window 60 illustrated in FIG. 8 is displayed on the display screen of the display device 3 under the control of the CPU 2 (an example of a similarity determination condition designation window display control device). The similarity determination condition designation window 60 may be displayed to be included in and overlap the image list window 50, may be displayed to overlap a part of the image list window 50, and may be displayed not to overlap the image list window 50.

With reference to FIG. 8, five checkboxes 61 to 65 are formed in the similarity determination condition designation window 60. The checkboxes 61 to 65 can be checked by using the mouse 9. A similarity determination condition is designated among a plurality of similarity determination conditions by checking any one or all of the checkboxes 61 to 65, and thus entry of the similarity determination condition is received in the image extraction apparatus 1.

A predefined similarity determination condition is displayed in correspondence with each of the checkboxes 61 to 65. A first similarity determination condition that "only images of an identical person are set as similar images" is displayed on the right part of the first checkbox 61. In the first similarity determination condition, two images are determined as being similar to each other in a case where a matching degree of two images including only an image of an identical person is equal to or more than a threshold value when the two images are contrasted with each other (therefore, two images are determined as being dissimilar to each other in a case where an image other than the image of the identical person is included in one image). Generally, a determination is performed on the basis of a determination criterion that two images are determined as being similar to each other in a case where a matching degree is equal to or more than a threshold value when the two images are subjected to matching, but, in the present embodiment, a similarity determination criterion may be set to be a stricter criterion by adding other conditions to the determination criterion, or may be set to be a gentler criterion. The first similarity determination condition is a similarity determination condition that, even in a case where such a matching degree is high, two images are determined as being dissimilar to each other in a case where persons included in the two images do not match each other (which corresponds to a case where a similarity determination criterion is strict; and this applies up to the following fourth similarity determination condition).

A second similarity determination condition that "only images including an identical facial expression (smile) are set as similar images" is displayed on the right part of the second checkbox 62. In the second similarity determination condition, two images are determined as being similar to each other in a case where a matching degree of the two images is equal to or more than a threshold value, and facial expressions of a person included in the two images are the same as each other (a matching degree of facial expressions is equal to or more than a threshold value) (therefore, even in a case where a matching degree of two images is equal to or more than a threshold value, the two images are determined as being dissimilar to each other in a case where facial expressions of a person included in the two images are determined as being different from each other).

A third similarity determination condition that "only images in which person subjects have an identical size are set as similar images" is displayed on the right part of the third checkbox 63. In the third similarity determination condition, two images are determined as being similar to each other in a case where a matching degree of the two images is equal to or more than a threshold value, and the extents of sizes of person subjects included in the two images (a ratio of a size of a person subject to a size of the entire image) are the same as each other (within a predetermined range) (therefore, even in a case where a matching degree of two images is equal to or more than a threshold value, the two images are determined as being dissimilar to each other unless the extents of sizes of person subjects included in the two images are the same as each other).

A fourth similarity determination condition that "only images of which imaging times are consecutive are set as similar images" is displayed on the right part of the fourth checkbox 64. In the fourth similarity determination condition, two images are determined as being similar to each other in a case where a matching degree of the two images is equal to or more than a threshold value, and imaging times for the two images are consecutive, that is, there is no image which is captured between the two images contrasted with each other for similarity determination (therefore, even in a case where a matching degree of two images is equal to or more than a threshold value, the two images are determined as being dissimilar to each other in a case where there is any captured image between the two contrasted images).

A fifth similarity determination condition that "a vertical image and a horizontal image set as similar images" is displayed on the right part of the fifth checkbox 65. In the present embodiment, in a case where the fifth similarity determination condition is not applied, a matching degree between a vertical image (an image of which a vertical length is larger than a horizontal length) and a horizontal image (an image of which a horizontal length is larger than a vertical length) is not calculated (therefore, two images are determined as being dissimilar to each other). However, in a case where the fifth similarity determination condition is applied, a matching degree of two images is calculated, and the two images are determined as being similar to each other in a case where the matching degree is equal to or more than a threshold value (a matching degree of a vertical image and a horizontal image may be calculated, for example, by cutting out and comparing central square portions, adjusting an aspect ratio to one image, or performing various operations on one or both of the images; and, in a case where square images are mixed, the fifth checkbox may be checked). In a case where the fifth similarity determination condition is applied, more images may be determined as being similar to each other than in a case where the fifth similarity determination condition is not applied (which corresponds to a case where a similarity determination criterion is gentle).

In a case where two or more checkboxes are checked, images satisfying all similarity determination conditions indicated by the respective checkboxes are extracted as similar images (determination under an AND condition). In a case where two or more checkboxes are checked, images satisfying any one condition may be extracted as similar images (determination under an OR condition). A graphical user interface (GUI) for inputting a logical expression may be provided, and a user may input whether determination is performed under an AND condition or an OR condition with respect to conditions indicated by two or more checkboxes.

A similarity determination condition adding button 66 attached with the text "add similarity determination condition" and a determination button 67 attached with the text "determine" are formed to be clicked on a lower part in the similarity determination condition designation window 60. The similarity determination condition adding button 66 is clicked by the user in a case where conditions other than the similarity determination conditions displayed in the similarity determination condition designation window 60 are added as similarity determination conditions. The determination button 67 is clicked by the user in a case where a similarity determination condition is determined.

In a case where a similarity determination condition is added (YES in step 25 in FIG. 2), the similarity determination condition adding button 66 is clicked by using the mouse 9. Then, a similarity determination condition adding window 70 illustrated in FIG. 9 is displayed on the display screen of the display device 3 (step 26 in FIG. 3).

In FIG. 9, five checkboxes 71 to 75 are also included in the similarity determination condition adding window 70. An added similarity determination condition that "only images having an identical tint are set as similar images" is displayed on the right part of the checkbox 71. In this added similarity determination condition, two images are determined as being similar to each other in a case where a matching degree of two images is equal to or more than a threshold value, and the extents of tints are the same as each other (equal to or more than a threshold value and the same as each other), and images having different tints, such as a black-and-white image and a color image are determined as being dissimilar to each other even in a case where a matching degree of the two images is equal to or more than the threshold value. Added similarity determination conditions are also displayed on the right parts of the other checkboxes 72 to 75.

By checking the checkboxes 71 to 75, it is possible to additionally designate similarity determination conditions other than the similarity determination conditions which can be designated by using the similarity determination condition designation window 60 illustrated in FIG. 8.

A similarity determination condition creation button 76 attached with the text "create similarity determination condition" and a back button 77 attached with "back" are formed on the lower part in the similarity determination condition adding window 70.

The similarity determination conditions displayed in the similarity determination condition designation window 60 illustrated in FIG. 8 and the added similarity determination conditions displayed in the similarity determination condition adding window 70 illustrated in FIG. 9 are set in the image extraction apparatus 1 in advance, and a similarity determination condition is designated from among the similarity determination condition and the added similarity determination conditions set in advance, but similarity determination conditions other than the similarity determination conditions may be created by the user. The similarity determination condition creation button 76 is clicked by the user in a case where a similarity determination condition is created as such. The back button 77 is clicked by the user in order to return to the similarity determination condition designation window 60 illustrated in FIG. 8 from the similarity determination condition adding window 70 illustrated in FIG. 9.

In a case where a similarity determination condition is created (YES in step 27 in FIG. 3), the similarity determination condition creation button 76 is clicked as described above. Then, a similarity determination condition entry window 80 illustrated in FIG. 10 is displayed on the display screen of the display device 3 by the CPU 2 (an example of a similarity determination condition entry window display control device) (step 28 in FIG. 3).

Figure 10:
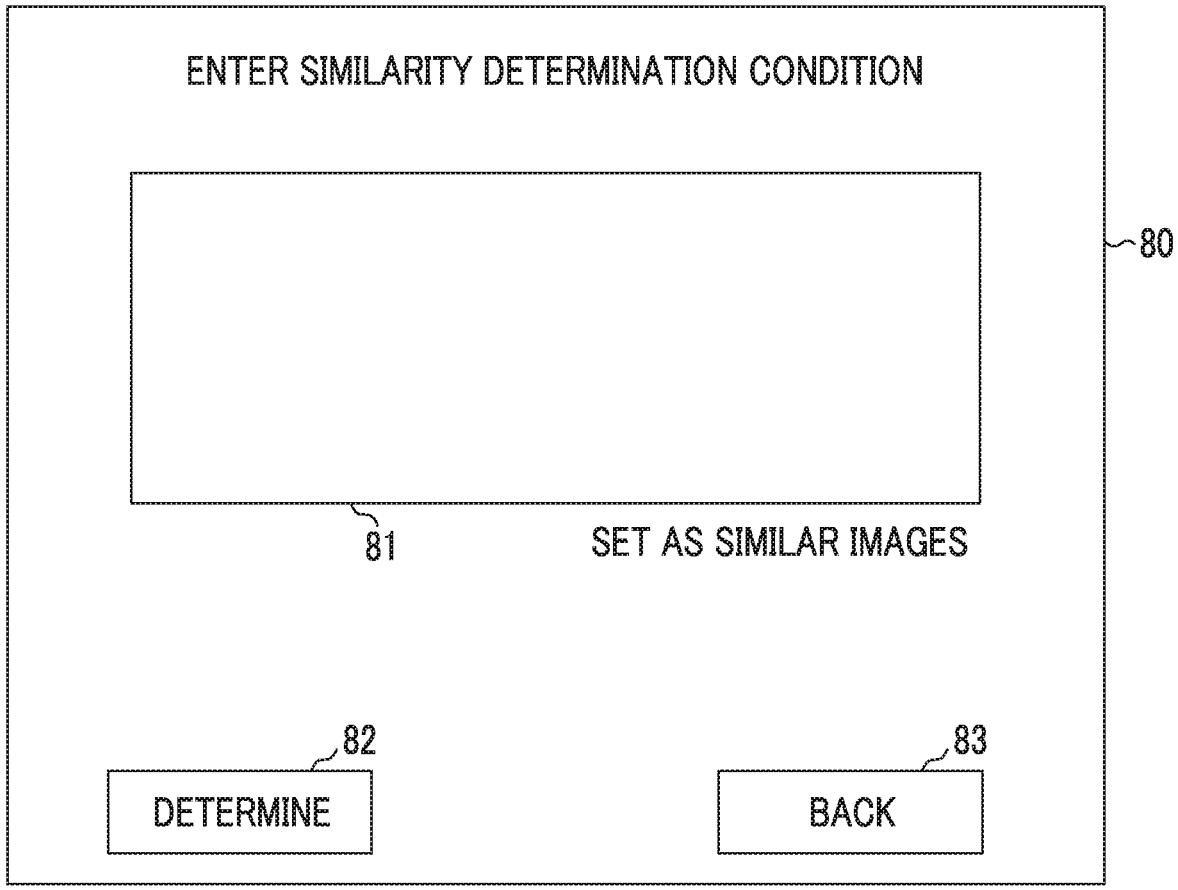
FIG. 10 illustrates an example of a similarity determination condition entry window.

In FIG. 10, a similarity determination condition entry region 81 is formed in the similarity determination condition entry window 80. The user creates a similarity determination condition, and enters the similarity determination condition to the similarity determination condition entry window 80 by using the keyboard 8. Consequently, the image extraction apparatus 1 receives entry of the entered similarity determination condition.

The image extraction apparatus 1 includes a similarity determination condition analysis device (not illustrated). The similarity determination condition analysis device performs morpheme analysis on a natural language entered by the user, so as to create a similarity determination condition which can be handled by the image extraction apparatus 1.

The similarity determination condition analysis device may apply a learning model in which learning is completed in advance to a natural language entered by the user, so as to create a similarity determination condition which can be handled by the image extraction apparatus 1.

A determination button 82 attached with the text "determine" and a back button 83 attached with the text "back" are formed under the similarity determination condition entry region 81. In a case where the determination button 82 is clicked by the user, the condition entered to the similarity determination condition entry region 81 is determined as a similarity determination condition. In a case where the back button 83 is clicked by the user (YES in step 29 in FIG. 3), the similarity determination condition entry window 80 disappears from the display screen. The similarity determination condition designation window 60 illustrated in FIG. 8 is displayed on the display screen. In a case where the determination button 67 included in the similarity determination condition designation window 60 is clicked (YES in step 30 in FIG. 4), the CPU 2 determines a similar image group according to the similarity determination condition (step 31 in FIG. 4). Also in a case where the back button 77 included in the similarity determination condition adding window 70 is clicked (NO in step 27 in FIG. 3 and YES in step 29 in FIG. 3) in a state in which the similarity determination condition adding window 70 illustrated in FIG. 9 is displayed, the similarity determination condition adding window 70 disappears from the display screen, and the similarity determination condition designation window 60 illustrated in FIG. 8 is displayed on the display screen. In a case where the determination button 67 included in the similarity determination condition designation window 60 is clicked (YES in step 30 in FIG. 4), the CPU 2 determines a similar image group according to the similarity determination condition (step 31 in FIG. 4). Also in a case where the similarity determination condition adding button 66 is not clicked and the determination button 67 is clicked (NO in step 25 in FIG. 2 and YES in step 30 in FIG. 4) in a state in which the similarity determination condition designation window 60 illustrated in FIG. 8 is displayed, the CPU 2 determines a similar image group according to the similarity determination condition (YES in step 30 in FIG. 4). A specific image is determined from among images indicated by image data read from the memory card 13, and a matching degree with the specific image is calculated for all the images indicated by the image data read from the memory card 13. The CPU 2 determines whether or not an image of which the calculated matching degree is equal to or more than a threshold value is an image conforming to the similarity determination condition on the basis of a relationship with the determined specific image, and, as a result, it is determined whether or not the image is similar to the specific image.

The keyboard 8, the mouse 9, and the similarity determination condition designation window 60, the similarity determination condition adding window 70, and the similarity determination condition entry window 80 displayed on the display screen of the display device 3 are similarity determination condition reception device for receiving entry of a similarity condition for determining whether or not, among a plurality of images, any two images are similar to each other through contrast. The CPU 2 is similar image group determination device for determining one or a plurality of similar image groups including two or more images similar to each other, according to the received similarity determination condition.

It is assumed that the first similarity determination condition that "only images of an identical person are set as similar images" included in the similarity determination condition designation window 60 illustrated in FIG. 8 is designated as a similarity determination condition. Then, among images of which a matching degree is equal to or more than a threshold value, images including an identical person are determined as a similar image group. For example, in the image list display region 51 of the image list window 50 illustrated in FIG. 7, the images I1, I2, I3, and I11 are determined as being similar images, and the CPU 2 determines a group including the images I1, I2, I3, and I11 as a first similar image group G1. Similarly, in the image list display region 51 of the image list window 50 illustrated in FIG. 7, the images I6 and I13 are determined as being similar images, and are determined as a second similar image group G2. Similarly, the images I8, I9, I10, and I12 are determined as being similar to each other, and are determined as a third similar image group G3; the images I16, I17, and I18 are determined as being similar to each other, and are determined as a fourth similar image group G4; the images I19 and I20 are determined as being similar to each other, and are determined as a fifth similar image group G5; and the images I22 and I23 are determined as being similar to each other, and are determined as a sixth similar image group G6.

Figure 11:
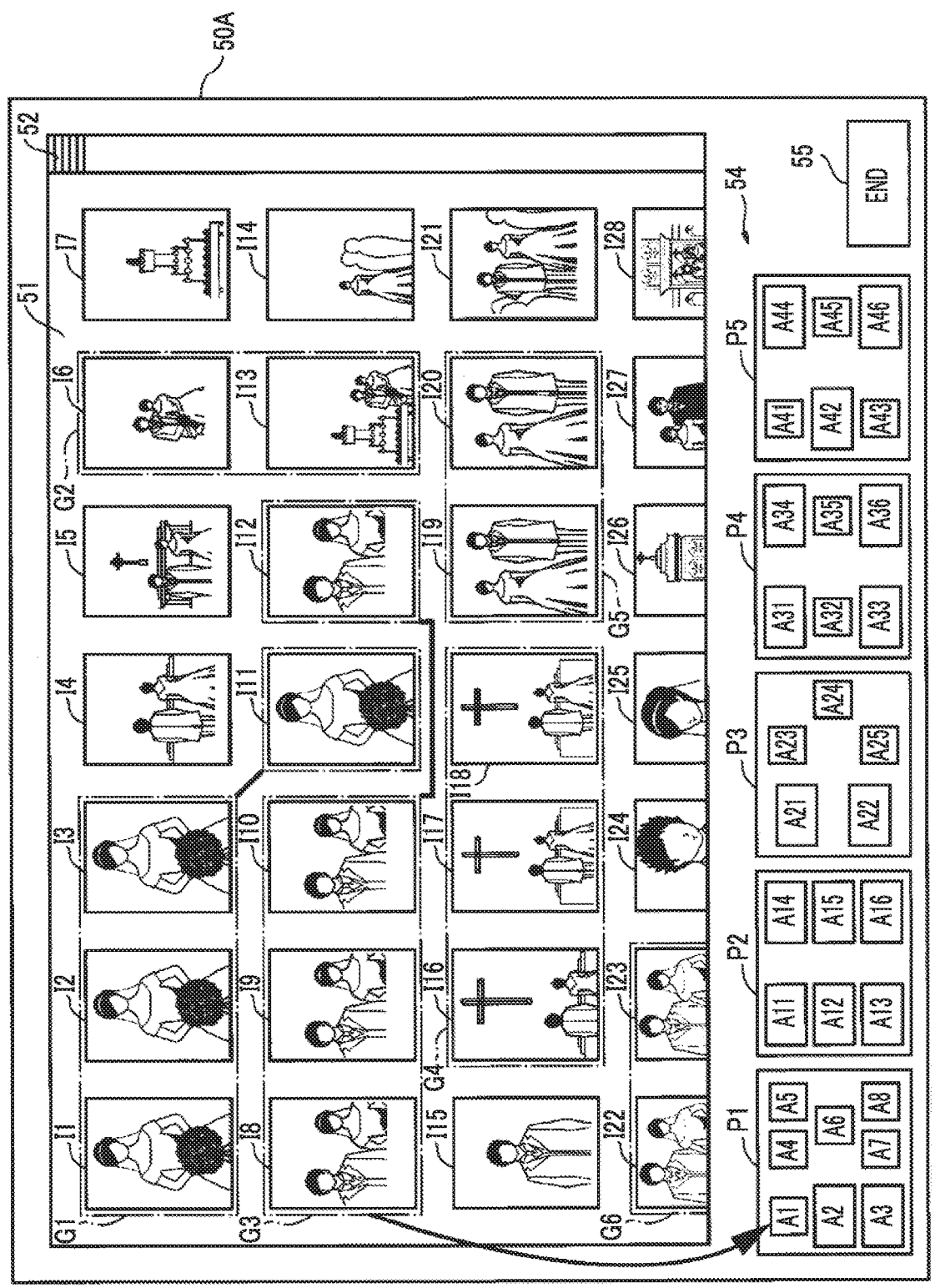
FIG. 11 illustrates an example of an editing window.

In a case where the similar image groups are determined, the image list window 50 displayed on the display screen of the display device 3 disappears from the display screen, and an editing window 50A illustrated in FIG. 11 is displayed on the display screen of the display device 3.

FIG. 11 illustrates an example of the editing window 50A.

The editing window 50A includes the image list display region 51 in the same manner as the image list window 50. As described above, multiple images indicated by image data read from the memory card 13 are displayed in a list form in the image list display region 51 as described above.

An editing thumbnail page image list display region 54 is formed under the image list display region 51. Thumbnail page images P1 to P5 respectively indicating layouts of pages forming an electronic album (album) are displayed in a list form in the editing thumbnail page image list display region 54. Image attachment regions A1 to A8 formed on a first page of the electronic album in a spread state are defined in the thumbnail page image P1. Similarly, image attachment regions A11 to A16 formed on a second page of the electronic album in a spread state are defined in the thumbnail page image P2. Image attachment regions A21 to A25, A31 to A35, and A41 to A46 formed on a third page, a fourth page, and a fifth page of the electronic album in a spread state are respectively formed in the thumbnail page images P3, P4, and P5. An end button 55 attached with the text "end" is formed on the right part of the editing thumbnail page image list display region 54.

As described above, the first similar image group G1 including the similar images I1, I2, I3, and I11 is surrounded by a chain line in the image list display region 51 of the editing window 50A (first display window). Consequently, the images I1, I2, I3, and I11 included in the first similar image group G1 and other images not included in the first similar image group G1 are displayed in a differentiated manner. Similarly, the second similar image group G2 including the similar images I6 and I13 is surrounded by a chain line; the third similar image group G3 including the similar images I8, I9, I10, and I12 is surrounded by a chain line; the fourth similar image group G4 including the similar images I16, I17, and I18 is surrounded by a chain line; the fifth similar image group G5 including the similar images I22 and I23 is surrounded by a chain line; and the sixth similar image group G6 including the similar images I19 and I20 is surrounded by a chain line. As mentioned above, the images similar to each other are displayed to be differentiated from other images, and thus the user can understand similar images among multiple images. A similarity determination condition is designated by the user, and thus images conforming to the user's intention can be determined as similar images.

Among the similar image groups G1 to G5, an image included in a certain similar image group and an image included in another similar image group are dissimilar to each other in determination under a similarity determination condition. For example, the images I1, I2, I3, and I11 included in the similar image group G1 and the images I8, I9, I10, and I12 included in the similar image group G3 are dissimilar to each other.

In FIG. 11, the similar image groups G1 to G5 are all surrounded by the chain lines, but, among the similar image groups G1 to G5, a certain similar image group may be displayed to be differentiated from the other similar image groups. For example, aspects of frames surrounding the similar image groups G1 to G5 may be changed for the respective similar image groups. The similar image groups are easily differentiated from each other. Since an image included in a similar image group and an image not included in the similar image group may be differentiated from each other, respective similar image groups may be displayed in a highlighted manner by changing colors for the respective similar image groups instead of surrounding the respective similar image groups with frames.

In FIG. 11, in a case where the similarity determination condition that "only images of which imaging times are consecutive are set as similar images" is designated (refer to FIG. 8), the image I3 and the image I11, the image I6 and the image I13, and the image I10 and the image I12 are not respectively consecutively captured, and are thus determined as being dissimilar to each other. As a result, the image I11 is removed from the first similar image group G1, and similar images included in the first similar image group G1 are the images I1, I2, and I3. The image I6 and the image I13 included in the second similar image group G2 are determined as being dissimilar to each other. The image I12 is removed from the third similar image group G3, and similar images included in the third similar image group G3 are the images I8, I9, and I10.

For example, in a case where the similarity determination condition that "only images of an identical person are set as similar images" is not designated (refer to FIG. 8), the image I21 and the image I19 or the image I20 are determined as being similar to each other, and the image I21 is included in the fifth similar image group G5 in addition to the images I19 and I20.

Figure 4:
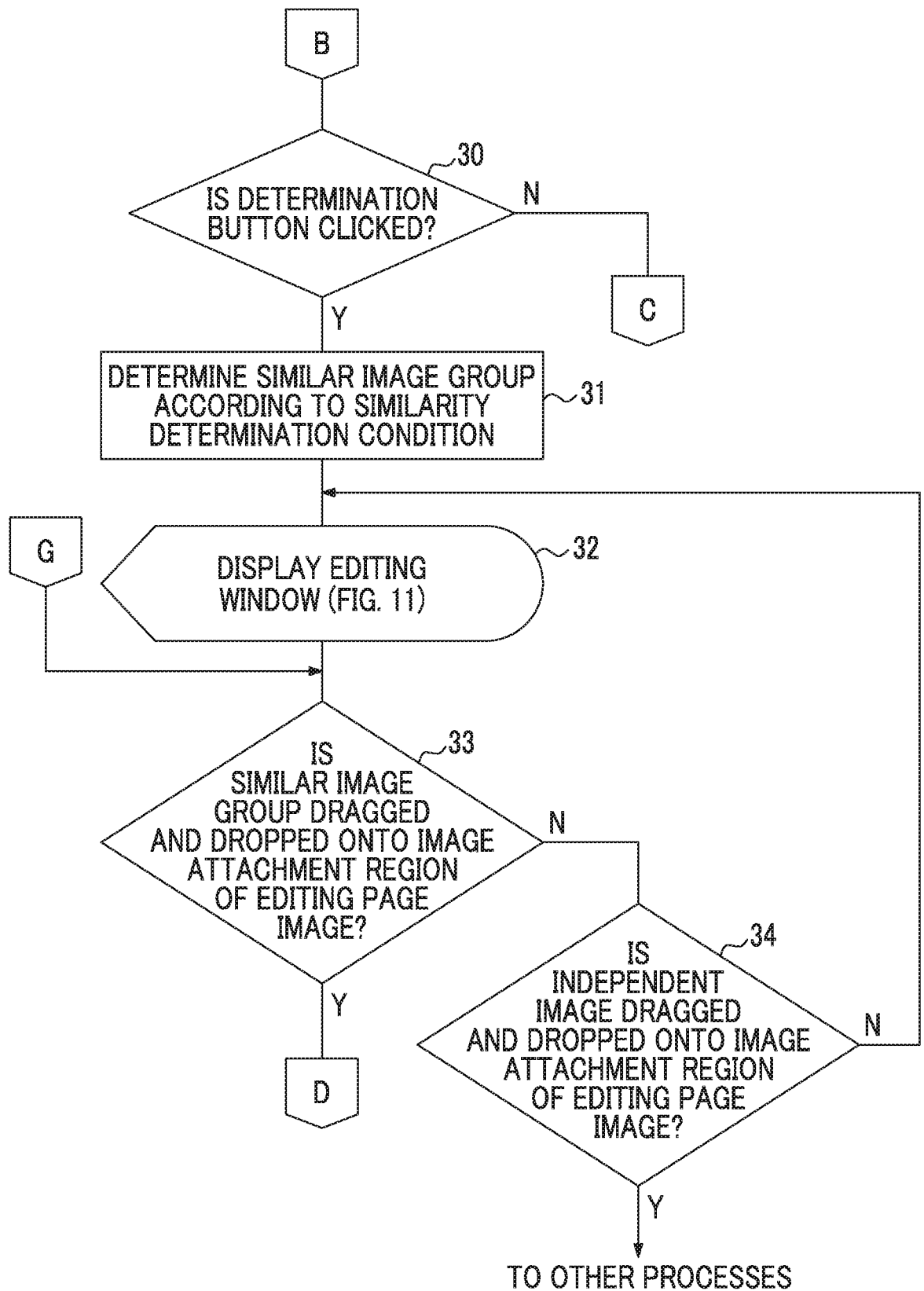
FIG. 4 is a flowchart illustrating a process procedure in the image extraction apparatus.
Figure 5:
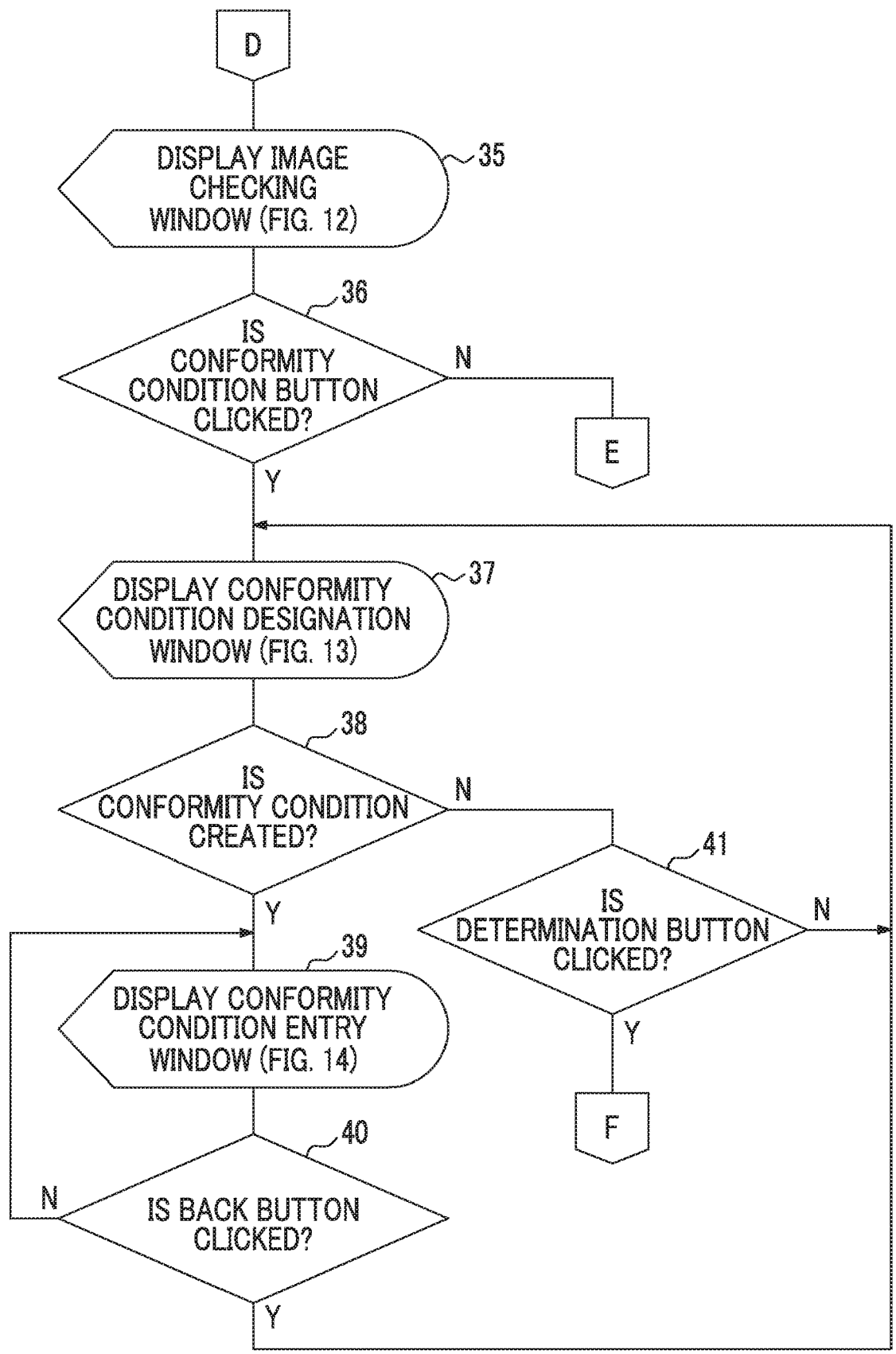
FIG. 5 is a flowchart illustrating a process procedure in the image extraction apparatus.
Figure 12:
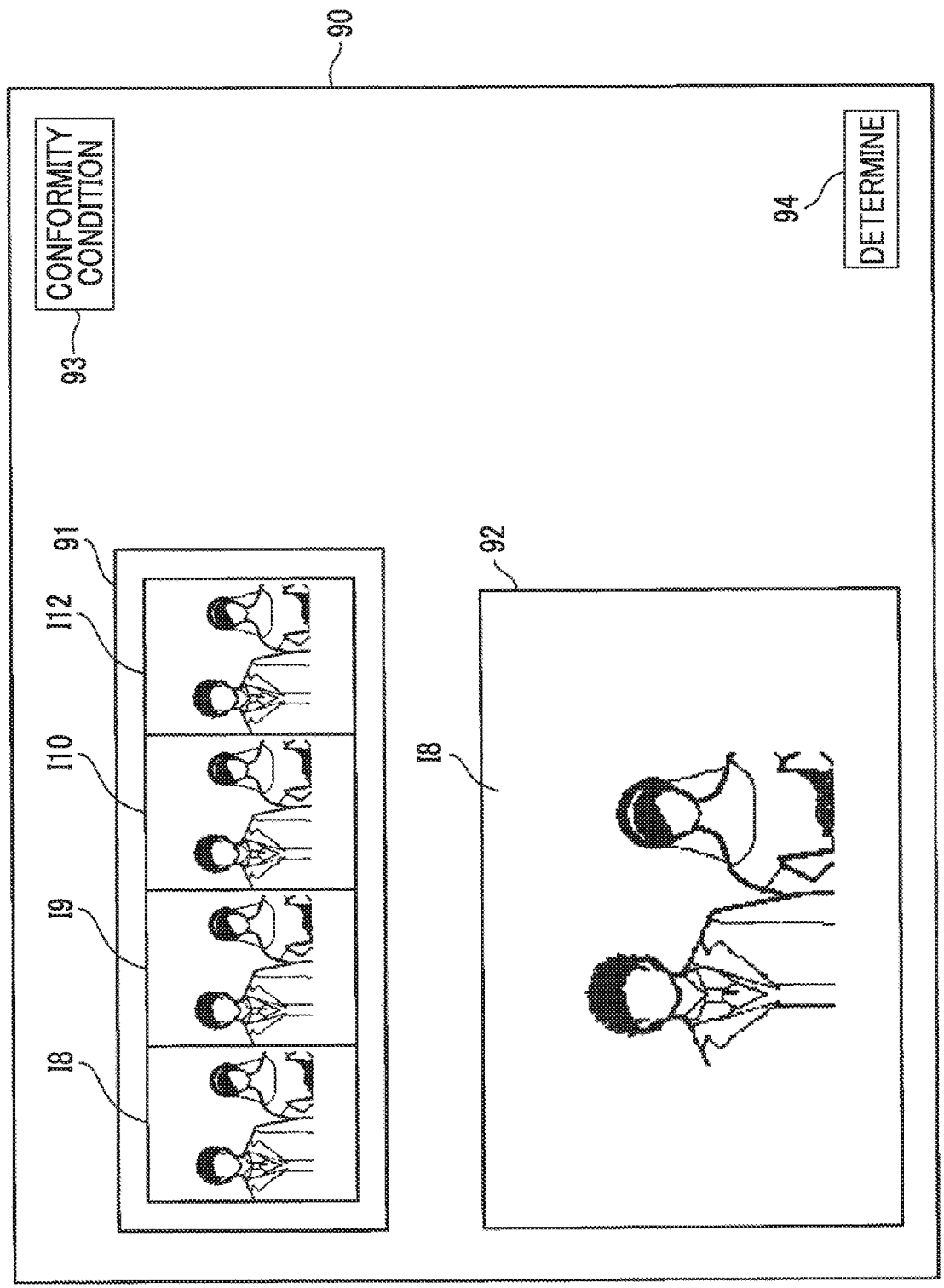
FIG. 12 illustrates an example of an image checking window.

In a case where any one of the similar image groups displayed in the image list display region 51 is dragged and dropped onto any one image attachment region in the thumbnail page images P1 to P5 by using the mouse 9 (an example of a similar image group designation device) (YES in step 33 in FIG. 4), an image checking window 90 (a second display window which is different from a first display window) illustrated in FIG. 12 is displayed on the display screen of the display device 3 (step 35 in FIG. 5). In a case where a similar image group is not dragged and dropped onto an image attachment region formed on any one of the thumbnail page images P1 to P5, and an image (referred to as an independent image) not included in the similar image group is dragged and dropped onto an image attachment region formed on any one of the thumbnail page images P1 to P5 (NO in step 33 in FIG. 4 and YES in step 34 in FIG. 4), other processes are performed. In the present embodiment, it is assumed that the third similar image group G3 is dragged and dropped onto the image attachment region A1 of the thumbnail page image P1. The mouse 9 corresponds to a similar image group designation device for designating a single similar image group from one or a plurality of similar image groups.

In FIG. 12, a similar image display region 91 is included in the image checking window 90. The similar images I8, I9, I10, and I12 included in the dragged and dropped similar image group G3 are displayed in the similar image display region 91. The similar images I8, I9, I10, and I12 are displayed to be adjacent to each other by the CPU 2 (an example of a similar image display control device). A dissimilar image is not displayed among the similar images I8, I9, I10, and I12, and the similar images I8, I9, I10, and I12 are displayed to be close contact with each other. A sentence or the like other than the images is not displayed among the images. However, the images may not be close contact with each other, and a sentence or the like may be displayed among the images. Even in a case where a dissimilar image may be displayed among the images, the dissimilar image may be differentiated from the similar images. The similar images may be displayed to be bright, and the dissimilar image may be displayed to be dark. For example, the images I8, I9, I10, I11, and I12 may be displayed in the similar image display region 91, the similar images I8, I9, I10, and I12 may be displayed to be bright, and the dissimilar image I11 may be displayed to be dark.

An image checking region 92 is formed under the similar image display region 91. Among the similar images displayed in the similar image display region 91, an image clicked by the user (initially, a predefined image, for example, an image first captured among the images displayed in the similar image display region 91) is displayed in the image checking region 92.

A conformity condition button 93 attached with the text "conformity condition" is formed on the right part of the similar image display region 91. A determination button 94 attached with "determine" is formed on the right part of the image checking region 92.

A size of the image checking window 90 illustrated in FIG. 12 may be made the same as a size of the editing window 50A illustrated in FIG. 11, and the image checking window 90 may be displayed on the editing window 50A so as to match the editing window 50A illustrated in FIG. 11. The image checking window 90 may be displayed to overlap a part of the editing window 50A. The image checking window 90 may be displayed not to overlap the editing window 50A.

In a case where the user clicks the conformity condition button by using the mouse 9 (YES in step 36 in FIG. 5), a conformity condition designation window 100 illustrated in FIG. 13 is displayed on the display screen of the display device 3 by the CPU 2 (an example of a conformity condition designation window display control device) (step 37 in FIG. 5).

FIG. 13 illustrates an example of the conformity condition designation window 100.

A conformity condition is a condition used to determine evaluation of a completion degree of an image. A conformity condition may be included in a similarity determination condition. The conformity condition designation window 100 (an example of a conformity condition reception device) includes four checkboxes 101 to 104. Conformity conditions are displayed to respectively correspond to the four checkboxes 101 to 104. A plurality of conformity conditions are displayed in the conformity condition designation window 100.

The text "eyes closing" is displayed on the right part of the first checkbox 101. The first checkbox 101 is checked, and thus the extent of a state of the eyes of a person included in an image being closed may be designated as a conformity condition. A scale attached with the text "never" at a left end and attached with the text "slightly" at a right end is formed on the right part of the text "eyes closing". A slider 105 may be moved horizontally on the scale by using the mouse 9. In a case where the slider 105 is moved toward the left, the conformity increases as there is no eyes closing in an image, and, in a case where the slider 105 is moved toward the right, the conformity for eyes closing increases even if there is slight eyes closing. The influence of eyes closing on the conformity may be adjusted by checking the checkbox 101 and moving the slider 105.

The text "blurring" is displayed on the right part of the second checkbox 102. The extent of blurring of an image may be designated as a conformity condition by checking the second checkbox 102. A scale attached with the text "strict" at a left end and attached with the text "gentle" at a right end is formed on the right part of the text "blurring". A slider 106 may be moved horizontally on the scale by using the mouse 9. In a case where the slider 106 is moved toward the left, the conformity increases as there is no blurring in an image, and, in a case where the slider 106 is moved toward the right, the conformity for blurring increases even if there is slight blurring. The influence of blurring on the conformity may be adjusted by checking the checkbox 102 and moving the slider 106.

The text "exposure" is displayed on the right part of the third checkbox 103. The extent of brightness of an image may be designated as a conformity condition by checking the third checkbox 103. A scale attached with the text "bright" at a left end and attached with the text "dark" at a right end is formed on the right part of the text "exposure". A slider 107 may be moved horizontally on the scale by using the mouse 9. In a case where the slider 107 is moved toward the left, the conformity increases as an image becomes brighter, and, in a case where the slider 107 is moved toward the right, the conformity increases as an image becomes darker. The influence of exposure on the conformity may be adjusted by checking the checkbox 103 and moving the slider 107.

The text "facial expression" is displayed on the right part of the fourth checkbox 104. A facial expression of a person included in an image may be designated as a conformity condition by checking the fourth checkbox 104. The text "laugh", the text "smile", the text "natural", and the text "cry" are displayed on the right part of the text "facial expression". Checkboxes 108, 109, 110, and 111 are respectively formed under the text "laugh", the text "smile", the text "natural", and the text "cry". The conformity increases as a facial expression comes closer to a facial expression of the text corresponding to a checked checkbox among the checkboxes 108, 109, 110, and 111. The influence of a facial expression on the conformity may be adjusted by checking the checkbox 104 and checking any one of the checkboxes 108, 109, 110, and 111.

A conformity condition entry button 112 attached with "enter conformity condition" and a determination button 113 attached with "determine" are formed on the lower part in the conformity condition designation window 100.

Figure 14:
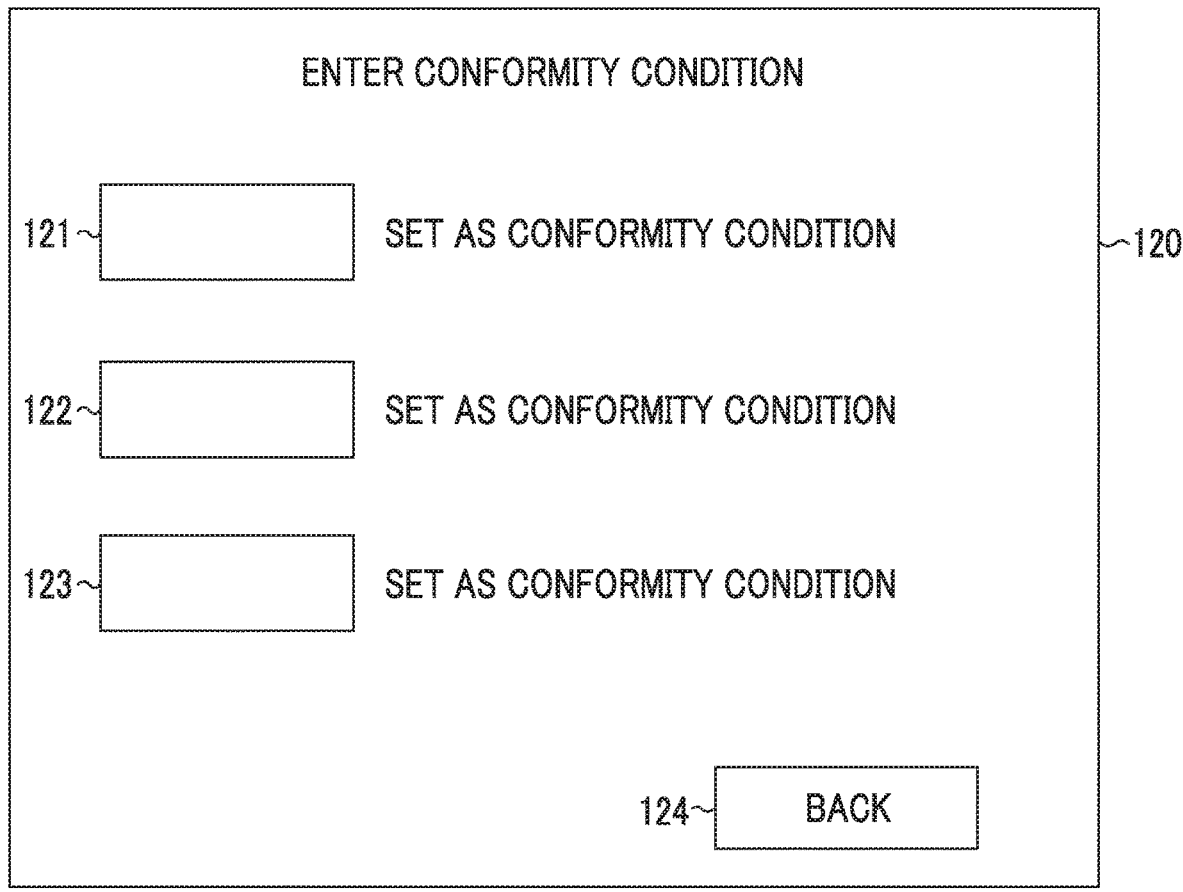
FIG. 14 illustrates an example of a conformity condition entry window.

In a case where the conformity condition entry button 112 is clicked (YES in step 38 in FIG. 5), a conformity condition entry window 120 (an example of a conformity condition reception device) illustrated in FIG. 14 is displayed on the display screen of the display device 3 by the CPU 2 (an example of a conformity condition entry window display control device) (step 39 in FIG. 5).

FIG. 14 illustrates an example of the conformity condition entry window 120.

The conformity condition entry window 120 includes three conformity condition entry regions 121, 122, and 123. A back button 124 attached with the text "back" is formed on the lower right part in the conformity condition entry window 120.

In a case where a conformity condition is entered to at least one region among the conformity condition entry regions 121, 122, and 123 by using the keyboard 8, the conformity condition is designated by the user. For example, in a case where a "resolution" is entered to any one of the conformity condition entry regions 121, 122, and 123, the resolution is set as a conformity condition, and the conformity increases as the resolution becomes higher. As illustrated in FIG. 13, a slider may be displayed, and the influence of the conformity in an entered conformity condition may be adjusted by using the slider. The image extraction apparatus 1 receives the entry of the conformity condition.

In a case where the back button 124 is clicked (YES in step 40 in FIG. 5), the conformity condition entry window 120 illustrated in FIG. 14 is erased from the display screen of the display device 3, and the conformity condition designation window 100 illustrated in FIG. 13 is displayed on the display screen of the display device 3 (step 37 in FIG. 5). In a case where the determination button 113 included in the conformity condition designation window 100 is clicked (NO in step 38 in FIG. 5 and YES in step 41 in FIG. 5), the conformity of the image displayed in the image checking region 92 of the image checking window 90 illustrated in FIG. 12 is calculated by the CPU 2 (an example of a conformity calculation device) according to the designated conformity condition (step 42 in FIG. 6). In a case where the conformity has been calculated, the image checking window 90 is updated by the CPU 2, and is displayed on the display screen of the display device 3 (step 47 in FIG. 6).

Figure 15:
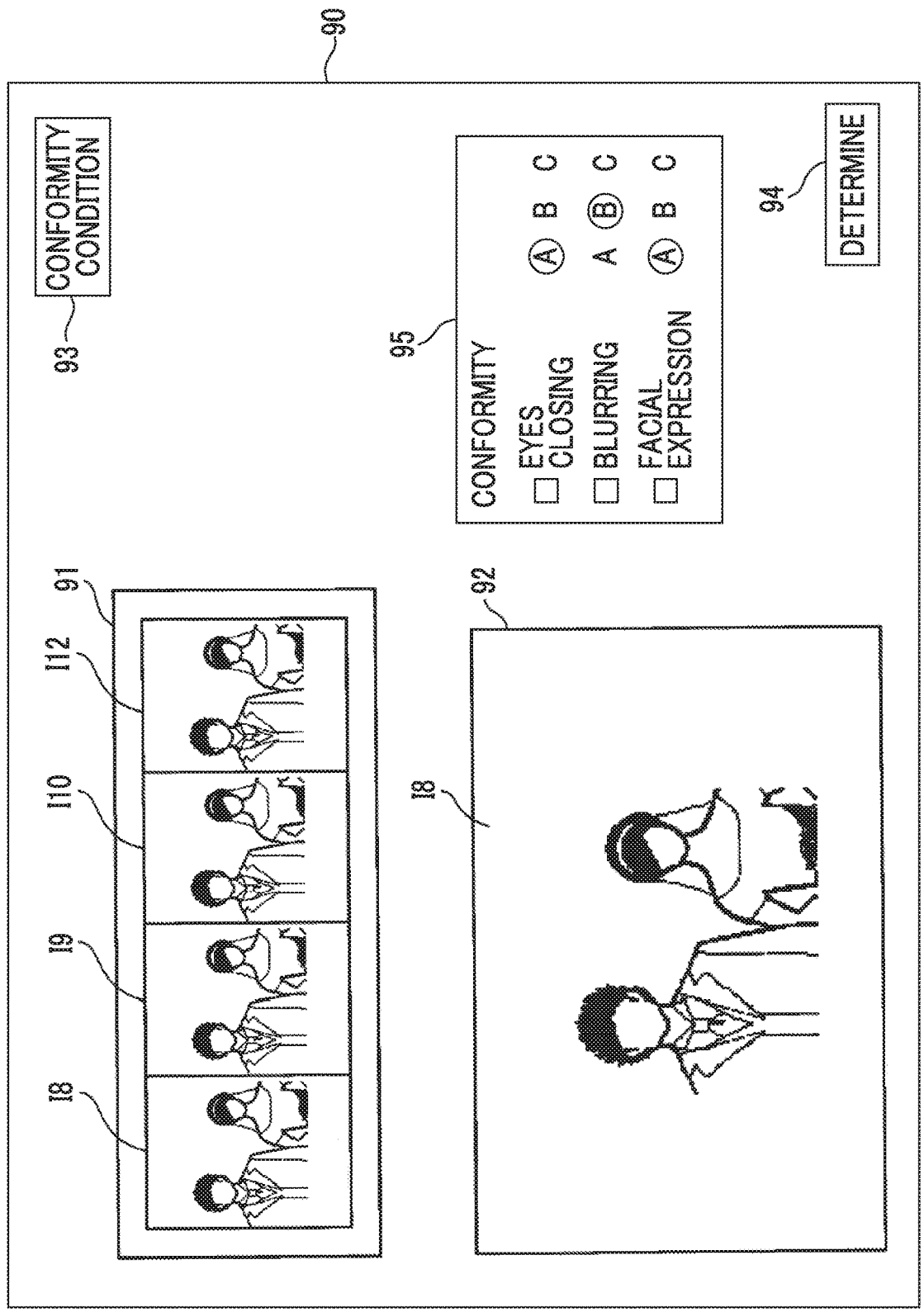
FIG. 15 illustrates an example of an image checking window.

FIG. 15 illustrates an example of the updated image checking window 90.

A conformity display region 95 is displayed in the image checking window 90. In the present embodiment, it is assumed that "eyes closing", "blurring", and "facial expression (laugh)" are designated as conformity conditions. The designated conformities "eyes closing", "blurring", and "facial expression (laugh)" are displayed in the conformity display region 95, and evaluation such as A, B, and C is displayed on the right part of each conformity. A is circled for the conformity of "eyes closing", and thus it can be seen that the conformity of the image I8 displayed in the image checking region 92 is given the evaluation of A with respect to "eyes closing". Similarly, B is circled for the conformity of "blurring", and thus it can be seen that the conformity of the image I8 displayed in the image checking region 92 is given the evaluation of B with respect to "blurring". A is circled for the conformity of "facial expression (laugh)", and thus it can be seen that the conformity of the image I8 displayed in the image checking region 92 is given the evaluation of A with respect to "facial expression (laugh)".

Figure 6:
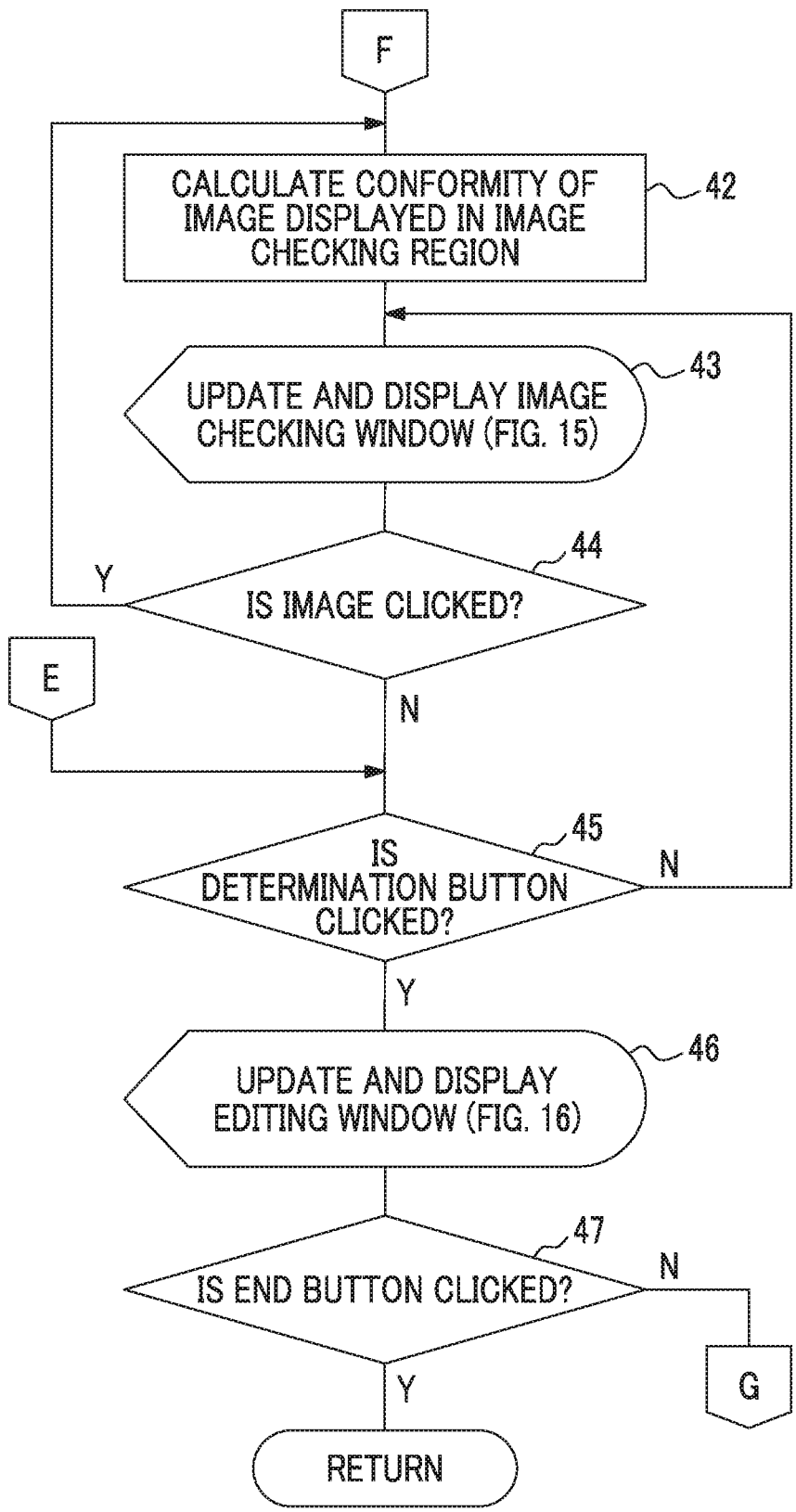
FIG. 6 is a flowchart illustrating a process procedure in the image extraction apparatus.

In a case where, among the similar images I8, I9, I10, and I11 displayed in the similar image display region 91, an image other than the image I8 displayed in the image checking region 92 is clicked by using the mouse 9 (YES in step 44 in FIG. 6), the conformity of the clicked image is calculated by the CPU 2 (an example of a conformity calculation device) on the basis of the designated conformity condition (step 42 in FIG. 6). The image checking window 90 is updated, and the calculated conformity is displayed in the conformity display region 95 (an example of a conformity notification device) (step 47 in FIG. 6).

Figure 16:
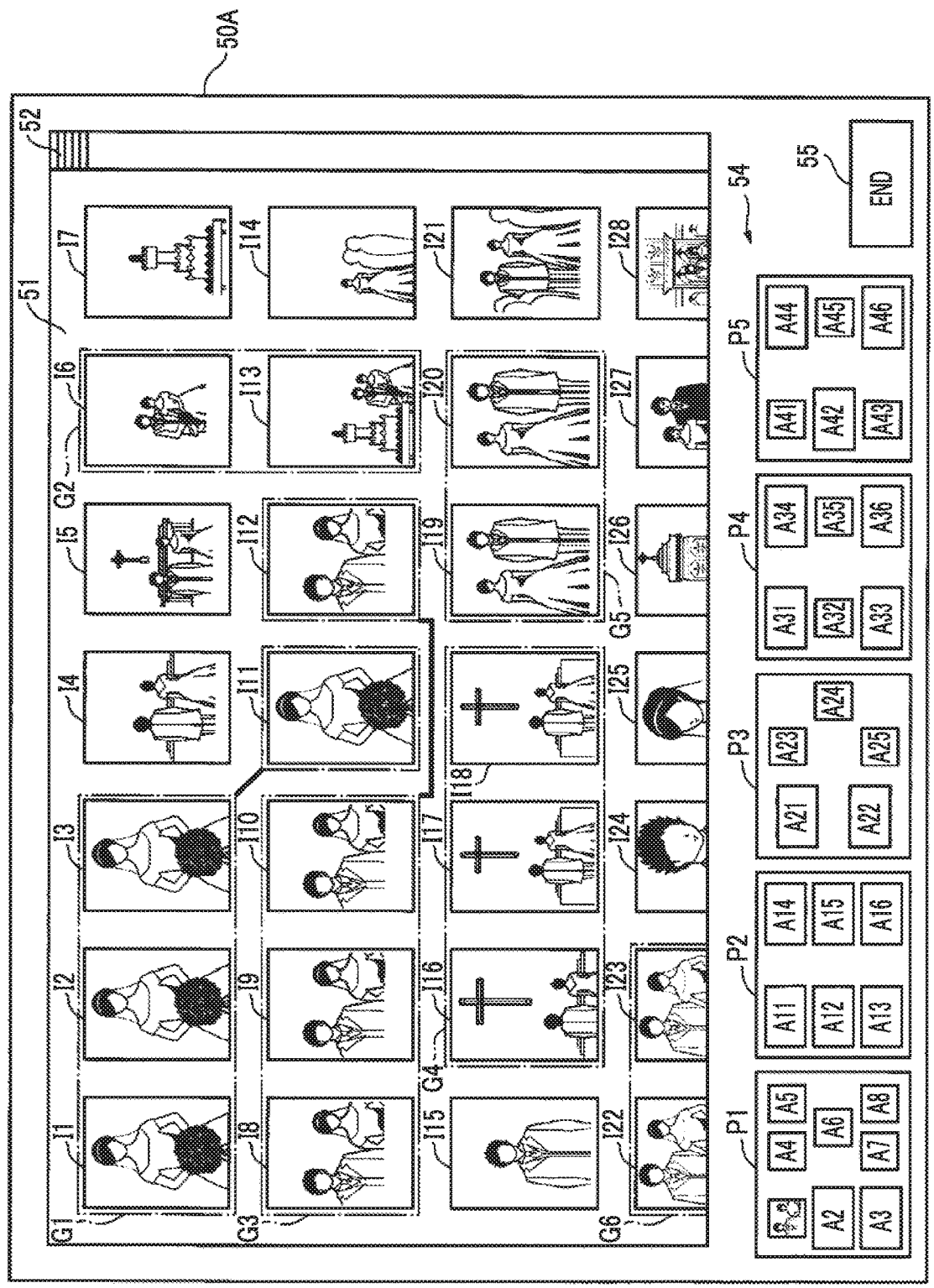
FIG. 16 illustrates an example of an editing window.

In a case where the determination button 94 is clicked (YES in step 45 in FIG. 6), the image checking window 90 is erased from the display screen of the display device 3, and the editing window 50A is displayed on the display screen of the display device 3 as illustrated in FIG. 16 (step 46 in FIG. 6).

In FIG. 16, in the editing window 50A, the image displayed in the image checking region 92 when the determination button 94 is clicked is attached to the image attachment region A1 onto which the similar image group G3 is dragged and dropped by the CPU 2. Consequently, at least one image is extracted from the similar image group G3 by the CPU 2 (an example of a similar image extraction device).

The processes from step 33 in FIG. 4 to step 46 in FIG. 6 are repeatedly performed until the end button 55 of the editing window 50A is clicked (step 47 in FIG. 6).

According to the first embodiment, a user can designate a similarity determination condition, and can thus find a similar image corresponding to the user's intention.

Second Embodiment

Figure 17:
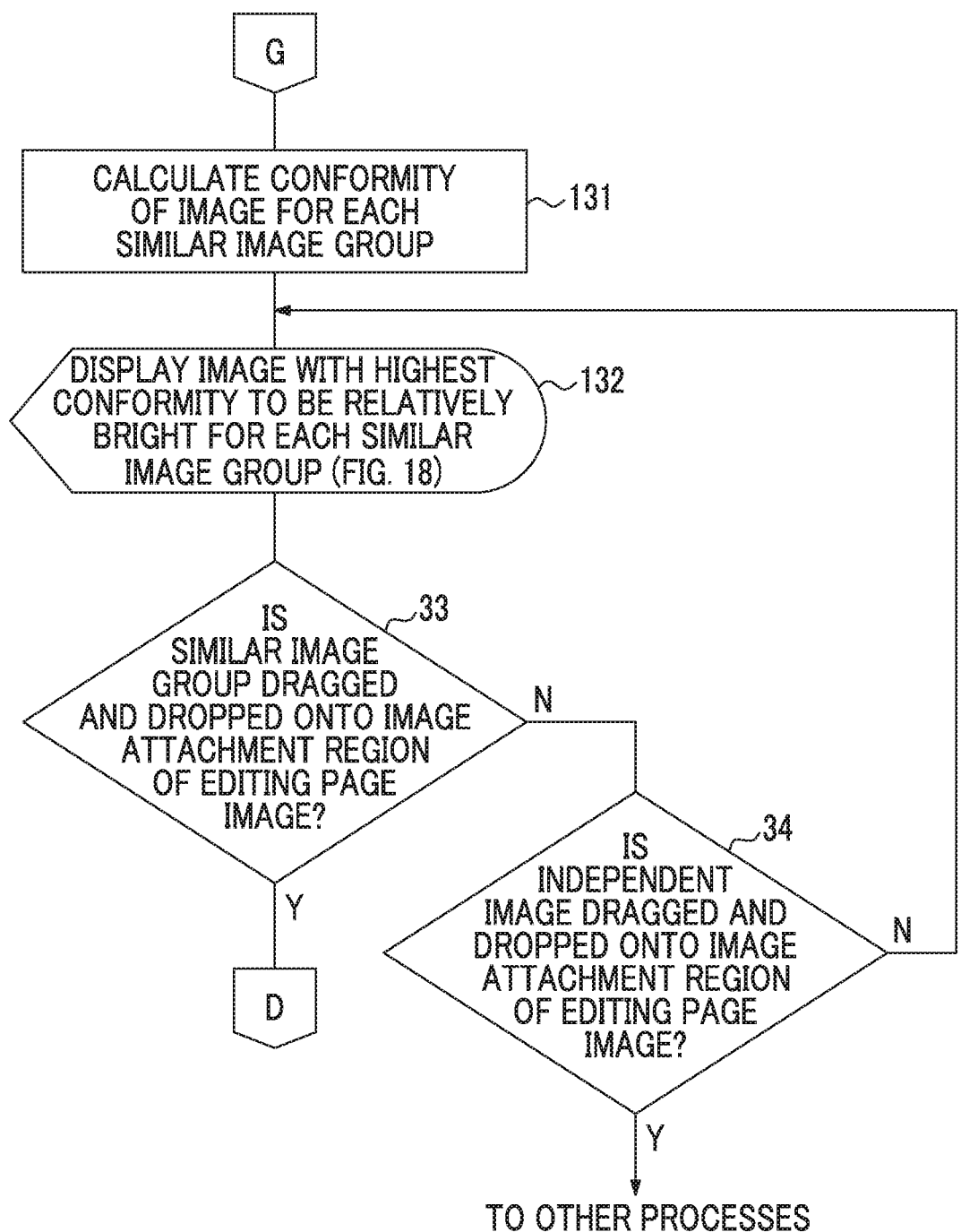
FIG. 17 is a flowchart illustrating an example of a process procedure in the image extraction apparatus.
Figure 18:
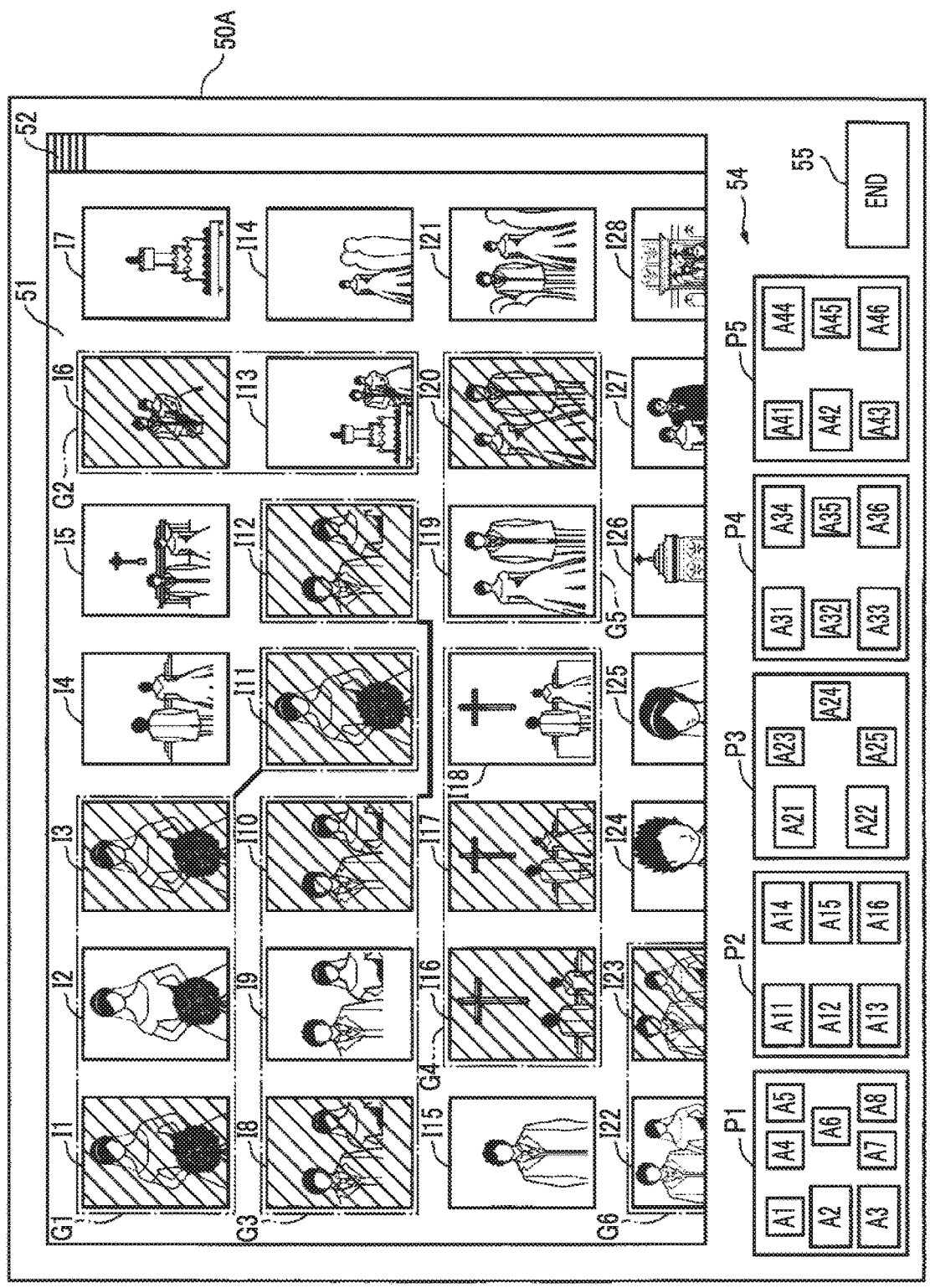
FIG. 18 illustrates an example of an editing window.

FIGS. 17 to 19 illustrates a second embodiment.

In the second embodiment, among images included in a designated similar image group, a user is notified of an image with a high conformity as a recommended image.

FIG. 17 is a flowchart illustrating a process procedure corresponding to steps 33 and 34 in FIG. 4, and illustrating a part of a process procedure in the image extraction apparatus 1.

As described with reference to the flowcharts in FIGS. 2 to 6, in a case where the editing window 50A illustrated in FIG. 16 is updated and displayed, the flow proceeds to the process in step 131 in FIG. 17 unless the end button 55 is pressed (step 47 in FIG. 6), and the conformity (this conformity is designated by a user or is based on a created conformity condition) of an image included in a similar image group is calculated by the CPU 2 for each similar image group (step 131 in FIG. 17). Then, for each similar image group, among the images included in the similar image group, an image with the highest conformity is displayed to be brighter than the other images included in the similar image group (step 132 in FIG. 17).

FIG. 18 illustrates an example of the editing window 50A.

The similar images I1, I2, I3, and I11 are included in the first similar image group G1, and, among the images I1, I2, I3, and I11, the image I2 is assumed to have a higher conformity than those of the other images I1, I3, and I11. Then, the image I2 is displayed to be brighter than the other images I1, I3, and I11. In the example illustrated in FIG. 18, the other images I1, I3, and I11 are hatched, and the image I2 is not hatched, and this indicates that the image I2 is brighter than the images I1, I3, and I11. As mentioned above, the image I2 with a relatively high conformity is displayed to be differentiated from the images with relatively low conformities, and thus an image with a high conformity can be recognized among images included in a similar image group.

Similarly, it can be seen that, in the second similar image group G2, the image I13 has a higher conformity than those of the image I6; in the third similar image group G3, the image I9 has a higher conformity than those of the images I8, I10, and I12; in the fourth similar image group G4, the image I8 has a higher conformity than those of the images I16 and I17; in the fifth similar image group G5, the image I19 has a higher conformity than those of the images I20 and I21; and, in the sixth similar image group G6, the image I22 has a higher conformity than that of the image I23.

In the same manner as described above, for example, in a case where the third similar image group G3 is dragged and dropped onto the image attachment region A1 of the page image P1 (YES in step 33 in FIG. 17), the image checking window 90 as illustrated in FIG. 19 is displayed on the display screen of the display device 3.

In FIG. 19, the images I8, I9, I10, and I12 included in the third similar image group G3 which is dragged and dropped are displayed in the similar image display region 91 (an example of a recommended image notification device) of the image checking window 90, but, in the same manner as display in the editing window 50A, the image I9 with a relatively high conformity is displayed to be bright (the image is not hatched in order to indicate that the image is bright), and the images I8, I10, and I12 with relatively low conformities are displayed to be dark (the images are hatched in order to indicate that the images are dark).

The image I9 with a relatively high conformity is displayed in the image checking region 92 (an example of a recommended image notification device), and the conformity of the image I9 displayed in the image checking region 92 is displayed in the conformity display region 95.

According to the second embodiment, it is possible to comparatively easily recognize an image with a relatively high conformity among images included in a similar image group.

In the first embodiment and the second embodiment, a similarity determination condition and a conformity condition are predefined, and, as necessary, the similarity determination condition entry window 80 illustrated in FIG. 10 is displayed, and a user enters a similarity determination condition, and the conformity condition entry window 120 illustrated in FIG. 14 is displayed, and the user enters a conformity condition. However, a similarity determination condition, a conformity condition, and the like may not be predefined, the user may enter a similarity determination condition by using the similarity determination condition entry window 80 illustrated in FIG. 10 or may enter a similarity determination condition by using the conformity condition entry window 120 illustrated in FIG. 14.

In the first embodiment and the second embodiment, after the image list window 50 illustrated in FIG. 7 is displayed, the similarity determination condition designation window 60 illustrated in FIG. 8, the similarity determination condition adding window 70 illustrated in FIG. 9, the similarity determination condition entry window 80 illustrated in FIG. 10, the conformity condition designation window 100 illustrated in FIG. 13, and the conformity condition entry window 120 illustrated in FIG. 14 are displayed. However, the windows 60, 70, 80, 100, and 120 may be displayed before the image list window 50 illustrated in FIG. 7 is displayed, and a similarity determination condition, a conformity condition, and the like may be initially determined. In any case, a user may designate or enter (create) a similarity determination condition, a conformity condition, and the like.

A processing section performing the above-described process includes not only the CPU 2 which functions as various processing units by executing software but also a programmable logical device such as a field-programmable gate array (FPGA) of which a circuit configuration can be changed after being manufactured, and a dedicated electric circuit which is a processor such as an application specific integrated circuit (ASIC) having a circuit configuration exclusively designed to perform a specific process.

A single processing section may be configured with one of various processors, and may be configured with a combination (for example, a combination of a plurality of FPGAs or a combination of a CPU and an FPGA) of the identical type or different types of two or more processors. As an example of configuring a plurality of processing sections with a single processor, first, there is an aspect in which a single processor is configured with a combination of one or more CPUs and software, and the processor functions as a plurality of processing units, as typified by a computer such as a client computer or a server. Second, there is an aspect of using a processor in which functions of the entire system including a plurality of processing units are realized by a single integrated circuit (IC), as typified by a system-on-chip. The various processing units are configured with one or more of various processors as a hardware structure.

A hardware structure of various processors is, more specifically, an electric circuit obtained by combining circuit elements such as semiconductor elements with each other.

In the above-described embodiments, the image extraction apparatus 1 has been described like a dedicated apparatus, but, instead of the dedicated apparatus, may be configured with a personal computer, may be configured with a so-called smart device such as a smart phone or a tablet apparatus, and may be configured with a mobile phone such as a feature phone.

What is claimed is:

1. An image extraction apparatus comprising:
a display controlling device for controlling a display device so as to display a plurality of independent similarity determination conditions on a display screen for determining whether or not any two images among a plurality of images are similar to each other in a case where the two images are contrasted with each other;
a similarity determination condition reception device for receiving a selection, by a user, of a similarity determination condition from the plurality of similarity determination conditions displayed on the display screen;
a similar image group determination device for determining one or a plurality of similar image groups including two or more images similar to each other according to the similarity determination condition received by the similarity determination condition reception device; and
an image extraction device for extracting at least one image from the one or plurality of similar image groups determined by the similar image group determination device.

2. The image extraction apparatus according to claim 1, further comprising:
a first image display control device for displaying a plurality of images in a first display window formed on a display screen of a display device, and displaying images included in the one or plurality of similar image groups determined by the similar image group determination device and images not included in the similar image groups in a differentiated manner.

3. The image extraction apparatus according to claim 2, wherein, among the plurality of similar image groups, the first image display control device displays a certain similar image group and the other similar image groups in a differentiated manner.

4. The image extraction apparatus according to claim 2, further comprising:
a similar image group designation device for designating a single similar image group from the one or plurality of similar image groups determined by the similar image group determination device; and
a similar image display control device for displaying images which are included in the similar image group designated by the similar image group designation device and are similar to each other, to be adjacent to each other in a second display window which is different from the first display window.

5. The image extraction apparatus according to claim 1, further comprising:
a similarity determination condition designation window display control device for displaying a similarity determination condition designation window in which a plurality of similarity determination conditions in a case where the two images are constructed with each other are displayed, on a display screen of a display device,
wherein the similarity determination condition reception device receives entry of a similar image determination condition according to a similarity determination condition designated among the plurality of similarity determination conditions displayed in the similarity determination condition designation window.

6. The image extraction apparatus according to claim 5, wherein the similarity determination condition designation window displays different kinds of similarity determination conditions which are represented by a sentence.

7. The image extraction apparatus according to claim 5, wherein the similarity determination condition designation window displays sentences representing a plurality of similarity determination conditions and the sentences is different from a sentence inputted from the user.

8. The image extraction apparatus according to claim 5, further comprising:
a similarity determination condition entry window display control device for displaying a similarity determination condition entry window for entering a similarity determination condition on the display screen of the display device,
wherein the similarity determination condition designation window displays sentences representing a plurality of similarity determination conditions,
the similarity determination condition reception device receives entry of a similar image determination condition according to a similarity determination condition designated among the plurality of similarity determination conditions displayed in the determination condition designation window, and entry of a similarity determination condition which is entered in the similarity determination condition entry window, and
the similarity determination condition entry window is transition from the similarity determination condition designation window based on instruction from the user.

9. The image extraction apparatus according to claim 5, further comprising:
a similarity determination condition entry window display control device for displaying a similarity determination condition entry window for entering a similarity determination condition on the display screen of the display device,
wherein the user enters new similarity determination condition using the similarity determination condition entry window when a desired similarity determination condition is not included in the similarity determination condition designation window.

10. The image extraction apparatus according to claim 5, further comprising:
a similarity determination condition adding window display control device for displaying a similarity determination condition adding window for entering an additional similarity determination condition on the display screen of the display device,
a similarity determination condition entry window display control device for displaying a similarity determination condition entry window for entering a similarity determination condition on the display screen of the display device,
wherein the user adds similarity determination condition using the similarity determination condition adding window when a desired similarity determination condition is not included in the similarity determination condition designation window and the user enters new similarity determination condition using the similarity determination condition entry window when a desired similarity determination condition is not included in the similarity determination condition adding window.

11. The image extraction apparatus according to claim 1, further comprising:
a similar image group designation device for designating a single similar image group from the one or plurality of similar image groups determined by the similar image group determination device;
a conformity condition reception device for receiving entry of a conformity condition to determine evaluation of a completion degree of an image rather than image similarity;
a conformity calculation device for calculating a conformity in the conformity condition received by the conformity condition reception device with respect to an image designated among images which are included in the similar image group designated by the similar image group designation device and are similar to each other; and
a conformity notification device for performing a notification of the conformity calculated by the conformity calculation device.

12. The image extraction apparatus according to claim 11, further comprising:
a conformity condition designation window display control device for displaying a conformity condition designation window in which a plurality of conformity conditions are displayed, on a display screen of a display device,
wherein the conformity condition reception device receives entry of a conformity condition designated among the plurality of conformity conditions displayed in the conformity condition designation window.

13. The image extraction apparatus any one of claim 11, further comprising:
- a conformity condition entry window display control device for displaying a conformity condition entry window for entering a conformity condition on a display screen of a display device,
- wherein the conformity condition reception device receives entry of a conformity condition which is entered in the conformity condition entry window.

14. The image extraction apparatus according to claim 1, wherein, among a plurality of similar image groups, an image included in a certain similar image group is determined as being dissimilar to images included in the other similar image groups on the basis of the similarity determination condition received by the similarity determination condition reception device.

15. The image extraction apparatus according to claim 1, further comprising:
- a similarity determination condition entry window display control device for displaying a similarity determination condition entry window for entering a similarity determination condition on a display screen of a display device,
- wherein the similarity determination condition reception device receives entry of a similarity determination condition which is entered in the similarity determination condition entry window.

16. The image extraction apparatus according to claim 1, further comprising:
- a similar image group designation device for designating a single similar image group from the one or plurality of similar image groups determined by the similar image group determination device;
- a conformity calculation device for calculating conformities in a conformity condition received by a conformity condition reception device with respect to images which are included in the similar image group designated by the similar image group designation device; and
- a recommended image notification device performing a notification of an image with a highest conformity among the conformities calculated by the conformity calculation device, as a recommended image to be extracted by the image extraction device.

17. The image extraction apparatus according to claim 1, wherein either of the similarity determination conditions is designated using checkbox.

18. The image extraction apparatus according to claim 1, wherein the similarity determination condition device receives either of the similarity determination conditions represented by a natural language entered by the user.

19. The image extraction apparatus according to claim 18, wherein the image extraction apparatus performs morpheme analysis on the natural language so as to create the similarity determination condition.

20. The image extraction apparatus according to claim 1, wherein the similarity determination condition is represented by a sentence.

21. An image extraction method comprising:
- causing a display controlling device to control a display device so as to display a plurality of independent similarity determination conditions on a display screen for determining whether or not any two images among a plurality of images are similar to each other in a case where the two images are contrasted with each other;
- causing a similarity determination condition reception device to receive a selection, by a user, of a similarity determination condition from the plurality of similarity determination conditions displayed on the display screen;
- causing a similar image group determination device to determine one or a plurality of similar image groups including two or more images similar to each other according to the similarity determination condition received by the similarity determination condition reception device; and
- causing an image extraction device to extract at least one image from the one or plurality of similar image groups determined by the similar image group determination device.

22. A non-transitory recording medium storing a computer readable program for controlling a computer of an image extraction apparatus to execute:
- controlling a display device so as to display a plurality of independent similarity determination conditions on a display screen for determining whether or not any two images among a plurality of images are similar to each other in a case where the two images are contrasted with each other;
- receiving a selection, by a user, of a similarity determination condition from the plurality of similarity determination conditions displayed on the display screen;
- determining one or a plurality of similar image groups including two or more images similar to each other according to the received similarity determination condition; and
- extracting at least one image from the determined one or plurality of similar image groups.

23. An image extraction apparatus comprising:
a processor configured to:
- control a display device so as to display a plurality of independent similarity determination conditions on a display screen for determining whether or not any two images among a plurality of images are similar to each other in a case where the two images are contrasted with each other;
- receive a selection, by a user, of a similarity determination condition from the plurality of similarity determination conditions displayed on the display screen;
- determine one or a plurality of similar image groups including two or more images similar to each other according to the received similarity determination condition; and
- extract at least one image from the determined one or plurality of similar image groups.

* * * * *